(12) United States Patent
Park et al.

(10) Patent No.: US 11,286,341 B2
(45) Date of Patent: Mar. 29, 2022

(54) RING-OPENING POLYMERIZATIONS USING A FLOW REACTOR

(71) Applicants: International Business Machines Corporation, Armonk, NY (US); The Board of Trustees of the Leland Stanford Junior University, Stanford, CA (US)

(72) Inventors: Nathaniel H. Park, San Jose, CA (US); James L. Hedrick, Pleasanton, CA (US); Victoria A. Piunova, Los Gatos, CA (US); Dmitry Zubarev, San Jose, CA (US); Gavin O. Jones, San Jose, CA (US); Robert M. Waymouth, Palo Alto, CA (US); Binhong Lin, Stanford, CA (US)

(73) Assignees: INTERNATIONAL BUSINESS MACHINES CORPORATION, Armonk, NY (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 17/018,520

(22) Filed: Sep. 11, 2020

(65) Prior Publication Data
US 2020/0407496 A1    Dec. 31, 2020

Related U.S. Application Data

(62) Division of application No. 16/028,919, filed on Jul. 6, 2018, now Pat. No. 10,815,335.

(51) Int. Cl.
C08G 63/78    (2006.01)
C08G 63/91    (2006.01)
(Continued)

(52) U.S. Cl.
CPC ............ *C08G 63/785* (2013.01); *B01J 10/00* (2013.01); *B01J 19/0013* (2013.01); *B01J 19/06* (2013.01);
(Continued)

(58) Field of Classification Search
CPC .... C08G 64/30; C08G 64/205; C08G 63/912; C08G 63/785; B01J 10/00; B01J 19/0013;
(Continued)

(56) References Cited

U.S. PATENT DOCUMENTS 3,320,335 A    5/1967   Hedrick et al.
3,558,568 A    1/1971   Kobayashi et al.
(Continued)

FOREIGN PATENT DOCUMENTS

JP    S63-287948 A    11/1988
WO    9428054 A1      12/1994
(Continued)

OTHER PUBLICATIONS

Non-Final Office Action received for U.S. Appl. No. 15/839,420 dated Nov. 3, 2020, 218 pages.
(Continued)

*Primary Examiner* — Shane Fang
(74) *Attorney, Agent, or Firm* — Amin, Turocy & Watson, LLP

(57) ABSTRACT

Techniques regarding the synthesis of polyesters and/or polycarbonates through one or more ring-opening polymerizations conducted within a flow reactor and facilitated by a urea anion catalyst and/or a thiourea catalyst are provided. For example, one or more embodiments can comprise a method, which can comprise polymerizing, via a ring-opening polymerization within a flow reactor, a cyclic monomer in the presence an organocatalyst comprising a urea anion.

17 Claims, 15 Drawing Sheets

(51) Int. Cl.
    *C08G 64/20*     (2006.01)
    *C08G 64/30*     (2006.01)
    *B01J 19/00*     (2006.01)
    *B01J 10/00*     (2006.01)
    *B01J 19/06*     (2006.01)

(52) U.S. Cl.
    CPC .......... *C08G 63/912* (2013.01); *C08G 64/205* (2013.01); *C08G 64/30* (2013.01); *B01J 2219/002* (2013.01); *B01J 2219/00164* (2013.01); *B01J 2219/00186* (2013.01)

(58) Field of Classification Search
    CPC .............. B01J 19/06; B01J 2219/00164; B01J 2219/002; B01J 2219/00186
    See application file for complete search history.

(56) References Cited

U.S. PATENT DOCUMENTS

| | | | |
|---|---|---|---|
| 4,349,658 | A | 9/1982 | Mark et al. |
| 4,508,916 | A | 4/1985 | Newell et al. |
| 8,044,194 | B2 | 10/2011 | Dubois et al. |
| 8,236,902 | B2 | 8/2012 | Hogen-Esch et al. |
| 8,440,176 | B2 | 5/2013 | Laronde et al. |
| 8,829,128 | B2 | 9/2014 | Huhtanen et al. |
| 9,006,337 | B2 | 4/2015 | Zhong et al. |
| 9,108,172 | B2 | 8/2015 | Mattman et al. |
| 9,389,183 | B2 | 7/2016 | Chen et al. |
| 2010/0228060 | A1 | 9/2010 | Langstrom et al. |
| 2010/0305281 | A1 | 12/2010 | Fujiwara et al. |
| 2011/0207887 | A1 | 8/2011 | Duc et al. |
| 2012/0062228 | A1 | 3/2012 | Williamson et al. |
| 2013/0079465 | A1 | 3/2013 | Desbois et al. |
| 2013/0102728 | A1 | 4/2013 | Yang et al. |
| 2016/0289399 | A1 | 10/2016 | Underwood et al. |
| 2017/0240668 | A1 | 8/2017 | Suau et al. |
| 2017/0291971 | A1 | 10/2017 | Serrano et al. |
| 2019/0177466 | A1 | 6/2019 | Hedrick et al. |

FOREIGN PATENT DOCUMENTS

| | | |
|---|---|---|
| WO | 2009/009251 A1 | 1/2009 |
| WO | 2016/037630 A1 | 3/2016 |
| WO | 2016/049123 A1 | 3/2016 |
| WO | 2016/200956 A1 | 12/2016 |

OTHER PUBLICATIONS

STN Search of CAS No. 21634-97-9_Entered Nov. 16, 1984.
Non-Final Office Action received for U.S. Appl. No. 16/028,989 dated Mar. 30, 2020, 109 pages.
Final Office Action received for U.S. Appl. No. 16/028,919 dated Apr. 9, 2020, 16 pages.
Final Office Action received for U.S. Appl. No. 15/839,420 dated May 19, 2020, 171 pages.
Final Office Action received for U.S. Appl. No. 16/028,989 dated Aug. 25, 2020, 119 pages.
Whitmarsh (Synthesis and Chemical Modification of Polyoxyalkylene Block Copolymers; in Nonionic Surfactants Polyoxyalkylene Block copolymers, edited by Vaughn Nace, Marcel Dekker, 1996, Chapter 1, excerpt pp. 1-4). (Year: 1996).
Hassouna et al., "Phosphazene/triisobutylaluminum-promoted anionic ring-opening polymerization of 1,2-epoxybutane initiated by secondary carbamates", Polymer Chemistry, vol. 8, 2017, pp. 4005-4013.
Hu et al., "Ring-Opening Alternating Copolymerization of Epoxides and Dihydrocoumarin Catalyzed by a Phosphazene Superbase", Macromolecules, vol. 49, 2016, pp. 4462-4472.
Liu, Yaya, et al. "A Switch from Anionic to Bifunctional H-Bonding Catalyzed Ring-Opening Polymerizations Towards Polyether—Polyester Diblock Copolymers." Polymer Chemistry 9.2 (2018): 154-159. Polymer Chemistry (RSC Publishing). 4 pages.
Hu, Xin, et al. "Continuous Flow Ring-Opening Polymerizations." Reaction Chemistry & Engineering 2.1 (2017): 20-26. Reaction Chemistry & Engineering (RSC Publishing). 18 pages.
Lin, Binhong, et al. "Organic Ring-Opening Polymerization Catalysts: Reactivity Control by Balancing Acidity." Macromolecules, 2018, 51 (8), pp. 2932-2938. 7 pages.
Lin, Binhong, et al. "Urea Anions: Simple, Fast, and Selective Catalysts for Ring-Opening Polymerizations." J. Am. Chem. Soc., 2017, 139 (4), pp. 1645-1652. 8 pages.
Van Den Berg, Sebastiaan, et al. "Clickable Polylactic Acids by Fast Organocatalytic Ring-Opening Polymerization in Continuous Flow." Macromolecules, 2016. 9 pages.
Melker, Anna, et al. "Continuous Flow Synthesis of Poly(Methyl Methacrylate) via a Light-Mediated Controlled Radical Polymerization." Journal of Polymer Science Polymer Chemistry. 2015, 53, 2693-2698. 6 pages.
Gutmann, Bernhard, et al. "Continuous-Flow Technology—A Tool for the Safe Manufacturing of Active Pharmaceutical Ingredients." Angew. Chem. Int. Ed. 2015, 54, 6688-6728. 41 pages.
Britton, Joshua, et al. "Multi-Step Continuous-Flow Synthesis." Chem. Soc. Rev. 2017, 46, 1250-1271. 22 pages.
Zhang, Xiangyi, et al. "Fast and selective ring-opening polymerizations by alkoxides and thioureas". Nat. Chem. 2016, 8, 1047-1053. 7 pages.
Kamber, Nahrain, et al. "Organocatalytic Ring-Opening Polymerization." Chem. Rev. 2007, 107, 5813-5840. 28 pages.
Zhu, Ning, et al. "Enzymatic Continuous Flow Synthesis of Thiol-Terminated Poly(Valerolactone) and Block Copolymers." Macromolecular Rapid Communications 2018. 6 pages.
Zhu, Ning, et al. "Sn(OTf)2 Catalyzed Continuous Flow Ring-Opening Polymerization of ε-Caprolactone." RSC Advances, 2015, 5, 31554-31557. 4 pages.
Zhu, Ning, et al. "Continuous Flow Protecting-Group-Free Synthetic Approach to Thiol-Terminated Poly(ε-Caprolactone)." European Polymer Journal 2016, 80, 234-239. 6 pages.
Kundu Santanu, et al. "Continuous Flow Enzyme-Catalyzed Polymerization in a Microreactor." Journal of the American Chemical Society. 2011, 133, 6006-6011. 13 pages.
Reis, Marcus H., et al. "Continuous-Flow Chemistry for the Determination of Comonomer Reactivity Ratios." Polymer Chemistry. Jan. 2018. 7 pages.
Abe, Akihiro, et al. "Controlled Polymerization and Polymeric Structures: Flow Microreactor Polymerization, Micelles Kinetics, Polypeptide Ordering, Light Emitting Nanostructures." Advances in Polymer Science 259. 2013. 253 pages.
Leibfarth, Frank A., et al. "Scalable Synthesis of Sequence-Defined, Unimolecular Macromolecules by Flow-IEG." PNAS 2015, 201508599. 6 pages.
Zhu, Ning, et al. "Organocatalyzed Continuous Flow Ring-Opening Polymerizations to Homo- and Block-Polylactones." Polymer 2016, 84, 391-397. 7 pages.
Porta, Riccardo, et al. "Flow Chemistry: Recent Developments in the Synthesis of Pharmaceutical Products." Organic. Process Research & Development. Nov. 2015. 67 pages.
Chen, Mao, et al. "Improving Photo-Controlled Living Radical Polymerization from Trithiocarbonates through the Use of Continuous-Flow Techniques." Chem. Commun. 2015, 51, 6742-6745. 6 pages.
Micic, Nenad, et al. "Scale-up of the Reversible Addition-Fragmentation Chain Transfer (RAFT) Polymerization Using Continuous Flow Processing." Processes 2014, 2, 58-70. 13 pages.
Peng, J., et al. "The in Situ Formation of Nanoparticles via RAFT Polymerization-Induced Self-Assembly in a Continuous Tubular Reactor." Polymer Chemistry 2017, 8, 1495-1506. 14 pages.
Deihl, Christina, et al. "Accelerated Continuous Flow RAFT Polymerization." Macromolecules 2010, 43, 10311-10314. 4 pages.
Ramsey, Bonnie, L., et al. "Photoinduced Organocatalyzed Atom Transfer Radical Polymerization Using Continuous Flow." Macromolecules 2017, 50, 2668-2674. 7 pages.
Parida, Dambarudhar, et al. "Coil Flow Inversion as a Route to Control Polymerization in Microreactors." Macromolecules 2014, 47, 3282-3287. 6 pages.

(56) References Cited

OTHER PUBLICATIONS

Morsbach, Jan, et al. "Living Polymer Chains with Predictable Molecular Weight and Dispersity via Carbanionic Polymerization in Continuous Flow: Mixing Rate as a Key Parameter." Macromolecules 2016, 49, 5043-5050. 8 pages.
Mastan, Erlita, et al. "Continuous Production of Multiblock Copolymers in a Loop Reactor: When Living Polymerization Meets Flow Chemistry." Macromolecules 2017. 15 pages.
Natalello, Adrian, et al. "Living Anionic Polymerization in Continuous Flow: Facilitated Synthesis of High-Molecular Weight Poly(2-Vinylpyridine) and Polystyrene." Organic Process Research & Development. Jul. 2014. 7 pages.
Nagaki, Aiichiro "Microflow-System-Controlled Anionic Polymerization of Styrenes." Macromolecules 2008, 41, 6322-6330. 9 pages.
Tonhauser, Christoph, et al. "Microflow Technology in Polymer Synthesis." Macromolecules 2012, 45, 9551-9570. 20 pages.
Mascia, Salvatore, et al. "End-to-End Continuous Manufacturing of Pharmaceuticals: Integrated Synthesis, Purification, and Final Dosage Formation " Angew. Chem. Int. Ed. 2013, 52, 12359-12363. 6 pages.
Adamo, Andrea, et al. "On-Demand Continuous-Flow Production of Pharmaceuticals in a Compact, Reconfigurable System." Science 2016, 352, 61-67. 8 pages.
Lee, Ashlynn, L. Z., et al. "Injectable biodegradable hydrogels from vitamin D-functionalized polycarbonates for the delivery of avastin with enhanced therapeutic efficiency against metastatic colorectal cancer." Biomacromolecules 16, 465-75 (2015). 11 pages.
Nederberg, Fredrik, et al. "Biodegradable nanostructures with selective lysis of microbial membranes." Nature Chemistry, 409-14, Apr. 3, 2011. 6 pages.
Ono, Robert J., et al. "Benzyl chloride-functionalized polycarbonates: a versatile platform for the synthesis of functional biodegradable polycarbonates." Macromolecules 47, 7725-7731 (2014).
Park, Nathaniel H., et al. "Expanding the cationic polycarbonate platform: attachment of sulfonium moieties by postpolymerization ring opening of epoxides." ACS Macro Lett. 5, 1247-1252 (2016). 6 pages.
Isik, Mehmet, et al. Tuning the Selectivity of Biodegradable Antimicrobial Cationic Polycarbonates by Exchanging the Counter-Anion. Macromolecular Bioscience (2016). 8 pages.
Kubo, Tomohiro, et al. "Multifunctional homopolymers: postpolymerization modification via sequential nucleophilic aromatic substitution." Macromolecules (2016). 8 pages.
Spokoyny, Alexander M., et al. "A perfluoroaryl-cysteine S(N)Ar chemistry approach to unprotected peptide stapling." Journal of the American Chemical Society, 135, 5946-5949 (2013). 4 pages.
Park, Nathaniel H., et al. Organocatalyzed synthesis of fluorinated poly(aryl thioethers). Nature Communications. vol. 8, Issue 1, Dec. 2017. 7 pages.
Pratt, Russell C., et al. Exploration, optimization, and application of supramolecular thiourea-amine catalysts for the synthesis of lactide (co)polymers. Macromolecules vol. 39, 7863-7871 (2006). 9 pages.
Hall, Synthesis, Characterization, and Polymerization of Sulfonamide Based Bifunctional Monomers, 2016, 83 pages.
Quast et al., Hyperbranched Polyfluorinated benzyl ether polymers: Mechanism, kinetics, and optimization, Journal of Polymer Science Part A: Polymer Chemistry, 2014, pp. 985-994, vol. 52.
Chan et al., Chemically modifiable N-heterocycle-functionalized polycarbonates as a platform for diverse smart biomimetic nanomaterials, Chemical Science, 2014, pp. 3294-3300, vol. 5.
Mell, Peter, et al. "The NIST Definition of Cloud Computing." National Institute of Standards and Technology. Sep. 2011. 7 pages.
Appendix P—List of IBM Patents or Applications Treated as Related.
International Search Report and Written Opinion received for PCT Application Serial No. PCT/IB2018/059556, dated Mar. 20, 2019, 9 pages.
Non-Final Office Action received for U.S. Appl. No. 15/839,420 dated Jan. 30, 2020, 92 pages.
Non-Final Office Action received for U.S. Appl. No. 16/028,919 dated Feb. 14, 2020, 32 pages.
Notice of Allowance received for U.S. Appl. No. 16/029,025 dated Feb. 6, 2020, 56 pages.

RING-OPENING POLYMERIZATIONS USING A FLOW REACTOR

BACKGROUND

The subject disclosure relates to the use of a flow reactor to facilitate one or more ring-opening polymerizations, and more specifically, to using one or more flow reactors to facilitate one or more ring-opening polymerizations comprising a urea and/or thiourea anion catalyst.

The United States federal government publishes regulations (e.g., Good Manufacturing Practices (GMP)) to ensure the quality of pharmaceutical compounds, medical devices, and/or food. These regulations can regard the manufacturing, processing, packaging, and/or formulation of various products. Moreover, these regulations address issues of production, starting materials, sanitation, cleanliness of equipment, and/or monitoring through requisite tests. To meet these regulations, traditional industrialization techniques in the chemical industry have included batch processing, in which a series of operations are carried out over a period of time on a separate, identifiable item or parcel of material. Numerous chemical process industries retain batch processing as their primary method of manufacture. For example, products traditionally manufactured by batch processing can include pharmaceuticals, agrochemicals, dyestuffs, food additives, vitamins, and/or the like. For instance, numerous polymers, such as polyesters and/or polycarbonates, have been traditionally manufactured using batch processing.

However, batch processing can be time-consuming, require the design of manufacturing stages that can be difficult to reproduce, can necessitate adverse safety conditions (e.g., due to the transportation of chemicals and/or storage of volatile chemicals), can require a large labor force, and/or can be difficult to automate.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, apparatuses, and/or methods that can regard one or more ring-opening polymerizations within one or more flow reactors are described.

According to an embodiment, a method is provided. The method can comprise polymerizing, via a ring-opening polymerization within a flow reactor, a cyclic monomer in the presence an organocatalyst comprising a urea anion. An advantage of such a method can include the implementation of continuous processing to increase chemical reaction rates, as compared to traditional techniques. In some examples, the method can comprise reacting, via a second ring-opening polymerization within the flow reactor, an intermediate polymer with a second cyclic monomer in the presence of a chemical compound to form a block copolymer. The intermediate polymer can be formed from the polymerizing the cyclic monomer. Also, the chemical compound can comprise a functional group selected from a group consisting of a urea group and a thiourea group. An advantage of such a method can include the implementation of continuous processing to manufacture one or more copolymers (e.g., block copolymers).

According to another embodiment, a method is provided. The method can comprise polymerizing, via a ring-opening polymerization within a flow reactor, a cyclic monomer in the presence of an organocatalyst comprising a thiourea anion. An advantage of such a method can include the implementation of continuous processing to achieve manufacturing techniques that are highly reproducible, as compared to traditional industrialize polymerizations. In some examples, the method can comprise reacting, via a second ring-opening polymerization within the flow reactor, an intermediate polymer with a second cyclic monomer in the presence of a chemical compound to form a block copolymer. The intermediate polymer can be formed from the polymerizing the cyclic monomer. Also, the chemical compound can comprise a functional group selected from a group consisting of a urea group and a thiourea group. An advantage of such a method can be that an active catalyst can be switched during continuous processing of a copolymer to facilitate varying chemical reaction rates.

According to an embodiment, a system is provided. The system can comprise a flow reactor that can house a stream of chemical reactants to facilitate a polymerization. The system can also comprise a memory that stores computer executable components. Further, the system can comprise a processor, operably coupled to the memory, and that executes the computer executable components stored in the memory. The computer executable components can comprise an analysis component, operatively coupled to the processor, that can control a parameter of the flow reactor based on a characteristic of a polymer produced by the polymerization. An advantage of such a system can be that cognitive software applications can facilitate discovery of novel chemical compounds and/or novel manufacturing techniques using continuous processing.

In some examples, the flow reactor can comprise a sensor that can detect the characteristic. The parameter can affect a polymerization condition of the polymerization. Also, the polymerization condition can be selected from a group consisting of a flow rate of the stream, a turbulence of the stream within the flow reactor, and an amount of chemical reactants comprised within the stream. An advantage of such a system can be optimization of one or more polymerization conditions within the flow reactor.

According to another embodiment, a method is provided. The method can comprise forming a polyester by a ring-opening polymerization of a cyclic monomer in the presence of an organocatylst comprising an anion. The ring-opening polymerization can be performed within a flow reactor. An advantage of such a method can be that one or more polyesters can be formed via continuous processing rather than traditional batch processing techniques. In some examples, the anion can be selected from a group consisting of a urea anion and a thiourea anion. An advantage of such a method can be that the selected anion can facilitate polyester reaction rates that can be substantially shorter than reaction rates achieved via traditional polymerization conditions.

According to another embodiment, a method is provided. The method can comprise forming a polycarbonate by a ring-opening polymerization of a cyclic monomer in the presence of an organocatylst comprising an anion. The ring-opening polymerization can be performed within a flow reactor. An advantage of such a method can be that one or more polycarbonates can be formed via continuous processing rather than traditional batch processing techniques. In some examples, the cyclic monomer can be a cyclic carbonate monomer. Also, the anion can be selected from a group consisting of a urea anion and a thiourea anion. An advantage of such a method can be that the selected anion can facilitate polycarbonate reaction rates that can be substantially shorter than reaction rates achieved via traditional polymerization conditions.

DETAILED DESCRIPTION

Figure 1:
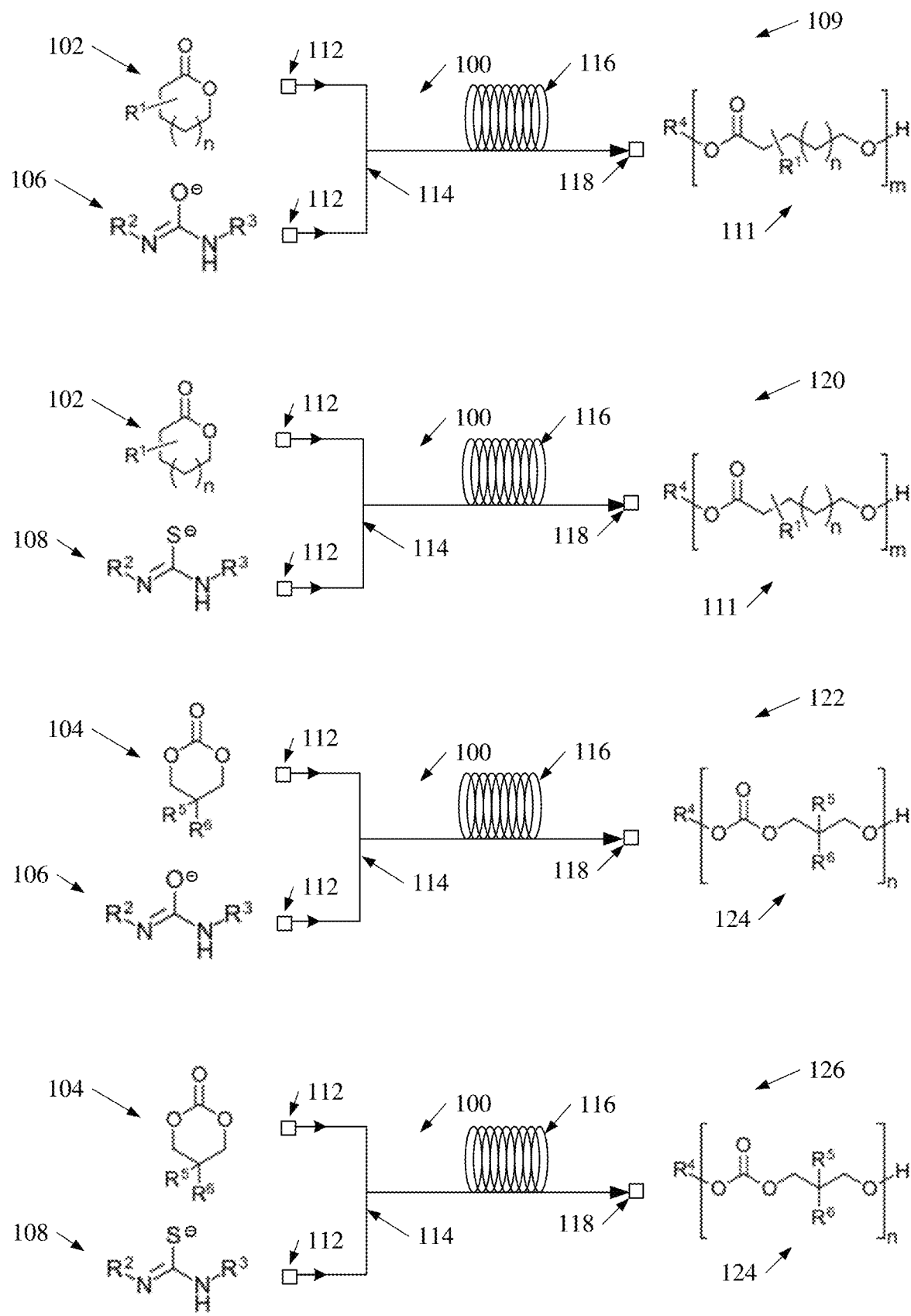
FIG. 1 illustrates a diagram of example, non-limiting polymerization schemes that can comprise one or more ring-opening polymerizations within one or more flow reactors in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problems with conventional techniques for polymerizing chemical compounds with batch processing; the present disclosure can be implemented to produce a solution to one or more of these problems in the form of a continuous production technique that can utilize organocatalysts within a flow reactor to produce one or more polymers (e.g., polyesters and/or polycarbonates). Continuous flow production techniques can take advantage of miniaturization, improved kinetic control, and/or expanded temperature ranges to circumvent many of the disadvantages associated with batch processing (e.g., long production times associated with heating and/or cooling batch reactors). Thus, continuous flow production designs can allow for: effective heat transfer, effective mixing, waste minimization, real time analysis, cleaner chemical products, novel chemical reactions, ease of scalability, and/or short reaction times. Further, one or more systems described herein can advantageously control and/or manipulate polymerization conditions of a flow reactor to: solve problems of reproducibility traditionally exhibited by batch processing, optimize polymerization conditions, and/or facilitate discovery of novel chemical compounds.

One or more embodiments described herein can regard forming homopolymers of polyesters and/or polycarbonates via one or more ring-opening polymerizations ("ROP") conducted within one or more flow reactors. For example, the one or more ROPs can comprise polymerizing one or more cyclic monomers (e.g., one or more lactone monomers and/or one or more cyclic carbonate monomers) in the presence of a urea anion catalyst (e.g., derived from a reaction with a chemical base). In another example, the one or more ROPs can comprise polymerizing one or more cyclic monomers (e.g., one or more lactone monomers and/or one or more cyclic carbonate monomers) in the presence of a thiourea anion catalyst (e.g., derived from a reaction with a chemical base). Thus, one or more embodiments can regard a continuous flow production of polyesters and/or polycarbonates via one or more ROPs within one or more flow reactors; wherein, as compared to traditional batch production techniques, the continuous flow production can achieve faster reaction times, a narrower dispersity of polymers, and/or tunable control over molecular weight distributions.

Additionally, use of urea anion catalysts and/or thiourea anion catalysts can provide a wide range of organocatalyst compounds, which can thereby provide a wide range of available catalytic activity. One or more embodiments can regard utilizing the wide range of available catalytic activity to facilitate the formation of multiblock copolymers via continuous flow productions, such as multiple ROPs within one or more flow reactors. For example, a first block of a given block copolymer can be polymerized via ROP within a flow reactor, which can be facilitated by a first urea anion catalyst and/or thiourea anion catalyst. A second block of the given block copolymer can be polymerized via another ROP within the flow reactor, which can be facilitated by a second urea anion catalyst and/or thiourea anion catalyst. A switch of the active catalyst from the first urea anion catalyst and/or thiourea anion catalyst to the second urea anion catalyst and/or thiourea anion catalyst can be performed via a proton transfer reaction conducted within the flow reactor. By switching the active catalyst, the catalytic activity within the flow reactor can be adjusted based on the cyclic monomer subject to ROP, wherein different cyclic monomers can be subject to ROP at different stages of flow through the flow reactor. In other words, a stream of chemical reactants can flow through the flow reactor thereby undergoing one or more ROPs to form a multiblock copolymer, wherein one or more additional chemical reactants can be injected into the flowing stream to facilitate formation of a block of the copolymer and/or a switch of the active catalyst.

Further, various embodiments of the present invention can be directed to computer processing systems, computer-implemented methods, apparatus and/or computer program products that facilitate the efficient, effective, and autonomous (e.g., without direct human guidance) control of one or more flow reactors to optimize polymerization conditions that can facilitate one more ROPs within the one or more flow reactors. The one or more ROPS within the one or more autonomously controlled flow reactors can facilitate the continuous production of, for example, polyesters and/or polycarbonates using anionic organocatalysts such as urea anion catalysts and/or thiourea anion catalysts. For example, one or more embodiments can regard one or more systems that can comprise one or more computer executable components that can facilitate autonomous control of one or more flow reactors to optimize polymerization conditions and/or discover various polymer compositions.

As used herein, the term "flow reactor" can refer to a device in which one or more chemical reactions can take place within one or more channels (e.g., microfluidic channels). For example, a flow reactor can facilitate continuous flow production, as opposed to batch production. One or more streams of chemical reactants can flow (e.g., continuously) through the one or more channels of the flow reactor, wherein one or more chemical reactions (e.g., polymerizations, protonations, and/or deprotonations) involving the chemical reactants can occur within the one or more channels as the one or more streams flow.

As used herein, the term "urea anion catalyst" can refer to an organocatalyst comprising one or more urea anions. For example, a urea anion catalyst can comprise a molecular backbone having one or more urea anions bonded (e.g., covalently) to one or more functional groups. As used herein, the term "thiourea anion catalyst" can refer to an organocatalyst comprising one or more thiourea anions. For example, a thiourea anion catalyst can comprise a molecular backbone having one or more thiourea anions bonded (e.g., covalently) to one or more functional groups.

FIG. 1 illustrates a diagram of example, non-limiting polymerization schemes that can facilitate ROP of one or more cyclic monomers within one or more flow reactors 100 in accordance with one or more embodiments described herein. For example, the plurality of polymerization schemes depicted in FIG. 1 can comprise ROP of lactone monomers 102 and/or cyclic carbonate monomers 104 within one or more flow reactors 100 (e.g., via a continuous flow production). Catalyst choice can directly affect the control over the one or more ROPs as well as the potential for deleterious transesterification reactions on the molecular backbone of produced polymers (e.g., homopolymers and/or copolymers), causing a broadening of the molecular weight distribution. Additionally, catalyst choice can determine the kinetics of polymerization and hence the residence times in the one or more flow reactors, affecting overall reactor throughput.

The one or more ROPs depicted via the polymerization schemes of FIG. 1 can comprise one or more urea anion catalysts 106 and/or the one or more thiourea anion catalysts 108. The one or more urea anion catalysts 106 and/or the one or more thiourea anion catalysts 108 can afford high selectivity and/or control over the ROPs within the one or more flow reactors 100. Additionally, the one or more urea anion catalysts 106 and/or the one or more thiourea anion catalysts 108 can exhibit very fast kinetics of polymerization, thereby potentially allowing for very short reactor residence times. Moreover, the reactivity of one or more cyclic monomers (e.g., one or more lactone monomers 102 and/or one or more cyclic carbonate monomers 104) can be matched with an appropriate urea anion catalyst 106 and/or thiourea anion catalyst 108 to facilitate controlled polymerization and minimization of molecular backbone transesterification.

Additionally, the one or more ROPs depicted via the polymerization schemes of FIG. 1 can be performed at room temperature. Further, the one or more ROPs depicted via the polymerization schemes of FIG. 1 can be characterized by residence times within the one or more flow reactors 100 ranging from, for example, greater than or equal to 0.006 seconds and less than or equal to 3.5 seconds. Moreover, the one or more ROPs depicted via the polymerization schemes of FIG. 1 can produce products characterized by narrow molecular weight distributions (Đ) ranging from, for example, greater than or equal to 1.07 and less than or equal to 1.15.

A first polymerization scheme 109 can comprise ROP of one or more lactone monomers 102 in the presence of one or more urea anion catalysts 106 (e.g., derived from and/or one or more chemical bases) to produce one or more polyesters 111. In one or more embodiments, the one or more urea anion catalysts 106 can be derived from one or more chemical bases. However, one of ordinary skill in the art will recognize that the one or more urea anion catalysts 106 can be derived through a variety of methodologies. As shown in the first polymerization scheme 109, the one or more lactone monomers 102 can optionally comprise one or more first functional groups (e.g., represented by "$R^1$"). Example first functional groups can include, but are not limited to: alkyl groups, aryl groups, substituted aryl groups, trifluoromethyl groups, phenyl groups, a combination thereof, and/or the like. Further, "n" can be an integer, for example, that is greater than or equal to zero (e.g., 1 or 2), so as to include five-member rings as well as macrocyclic lactones. Additionally, "m" can be an integer ranging, for example, from greater than or equal to 1 and less than or equal to 1000. Example lactone monomers can include, but are not limited to: ε-caprolactone, δ-valerolactone, iPr-phosphonate, and/or lactide. One of ordinary skill in the art will recognize that the chemical structure for the one or more lactone monomers 102 shown in FIG. 1 is exemplary and the one or more lactone monomers 102 can be characterized by a wide variety of chemical structures that comprise an ester group as part of a ring formation.

The one or more urea anion catalysts 106 can comprise a second functional group (e.g., represented by "$R^2$" in FIG. 1) and/or a third functional group (e.g., represented by "$R^3$" in FIG. 1). Example second and/or third functional groups can include, but are not limited to: alkyl groups, aryl groups, substituted aryl groups, trifluoromethyl groups, phenyl groups, a combination thereof, and/or the like. The one or more urea anion catalysts 106 can be ionized in the presence of the one or more chemical bases. The one or more chemical bases can comprise organic bases and/or strong metal containing bases. Example chemical bases can include, but are not limited to: 1,8-diazabicyclo[5.4.0]undec-7-ene ("DBU"), 7-methyl-1,5,7-triazabicyclo[4.4.0]dec-5-ene ("MTBD"), phosphazene bases, 1,3,2-diazaphosphorin-2-amin, 2-[(1,1-dimethylethyl)imino]-N,N-diethyl-1,2,2,2,3,4,5,6-octahydro-1,3-dimethyl ("BEMP"), 1,3-dihydro-1,3-bis(2,4,6-trimethylphenyl)imidazole-2-ylidene ("IMes"), potassium methoxide, potassium hydride, sodium methoxide, sodium hydride, a combination thereof, and/or the like.

The one or more flow reactors 100 can comprise, for example, one or more inlets 112, one or more channels 114, one or more reactor loops 116, and/or one or more outlets 118. The one or more channels 114 can extend from the one or more inlets 112 to the one or more outlets 118. The one or more channels 114 (e.g., microfluidic channels) can comprise, for example: tubes (e.g., microfluidic tubes), pipes, joiners (e.g., T-mixers), a combination thereof, and/or the like. Additionally, the one or more channels 114 can be oriented into one or more reactor loops 116 at one or more stages between the one or more inlets 112 and/or the one or more outlets 118. The one or more reactor loops 116 can influence the length of the one or more flow reactors 100 and thereby the residence time of the one or more ROPs within the one or more flow reactors 100. One of ordinary skill in the art will recognize that the number of loops comprising the reactor loops 116 and/or the dimensions of the loops can vary depending on a desired flow rate, residence time, and/or turbulence. Further, while the reactor loops 116 are depicted in FIG. 1 as characterized by circular shaped structures, the architecture of the reactor loops 116 is not so limited. For example, the one or more reactor loops 116 can be characterized by elliptical and/or polygonal shaped structures.

The one or more ROPs depicted via the first polymerization scheme 109 can produce one or more polyesters 111. The one or more polyesters 111 can comprise a fourth functional group (e.g., represented by "$R^4$" in FIG. 1) that can be derived from the one or more chemical bases. Example fourth functional groups can include, but are not limited to: alkyl groups, aryl groups, methyl groups, a combination thereof, and/or the like.

In the first polymerization scheme 109, the one or more lactone monomers 102 can enter the flow reactor 100 via one or more first inlets 112, while the one or more urea anion catalysts 106 and/or the one or more chemical bases can enter the flow reactor via one or more second inlets 112. The one or more lactone monomers 102 can meet and/or mix with the one or more urea anion catalysts 106 and/or the one or more chemical bases within the one or more channels 114 of the flow reactor 100; thereby forming a stream of chemical reactants. As the stream flows through the flow reactor, one or more ROPs can be facilitated by the one or more urea anion catalysts 106, whereby the one or more lactone monomers 102 can be polymerized to form one or more polyesters 111 (e.g., a homopolymer solution of polyesters 111).

The second polymerization scheme 120 exemplifies that one or more thiourea anion catalysts 108 can also be utilized to polymerize the one or more lactone monomers 102 and produce the one or more polyesters 111. Similar to the one or more urea anion catalysts 106, the one or more thiourea anion catalysts 108 can comprise the second functional group (e.g., represented by "$R^2$" in FIG. 1) and/or the third functional group (e.g., represented by "$R^3$" in FIG. 1). In one or more embodiments, the one or more urea anion catalysts 106 can be derived from one or more chemical bases. However, one of ordinary skill in the art will recognize that the one or more urea anion catalysts 106 can be derived through a variety of methodologies. Further, the one or more thiourea anion catalysts 108 can also be activated in the presence of the one or more chemical bases. As shown in the second polymerization scheme 120, the one or more thiourea anion catalysts 108 can facilitate one or more ROPs of the one or more lactone monomers 102 within one or more flow reactors 100 to produce one or more polyesters 111 (e.g., a homopolymer solution of polyesters 111). Also, as shown in the second polymerization scheme 120, "n" can be an integer ranging, for example, that is greater than or equal to zero, so as to include five-member rings as well as macrocyclic lactones. Additionally, "m" can be an integer ranging, for example, from greater than or equal to 1 and less than or equal to 1000.

Furthermore, as shown in the third polymerization scheme 122 the one or more urea anion catalysts 106 can facilitate one or more ROPs of the one or more cyclic carbonate monomers 104 within one or more flow reactors 100 to produce one or more polycarbonates 124. The one or more cyclic carbonate monomers 104 can comprise a fifth functional group (e.g., represented by "$R^5$" in FIG. 1) and/or a sixth functional group (e.g., represented by "$R^6$" in FIG. 1). Example fifth and/or sixth functional groups can include, but are not limited to: alkyl groups, aryl groups, methyl groups, phenyl groups, amide groups, amine groups, ketone groups, ester groups, carboxyl groups, alcohol groups, alkane groups, alkene groups, alkyne groups, aldehyde groups, imine groups, thiol groups, thioester groups, ether groups, a combination thereof, and/or the like. One of ordinary skill in the art will recognize that the chemical structure for the one or more cyclic carbonate monomers 104 shown in FIG. 1 is exemplary and the one or more cyclic carbonate monomers 104 can be characterized by a wide variety of chemical structures that comprise a carbonate group in a ring formation. As shown in the third polymerization scheme 122, "n" can be an integer ranging, for example, from greater than or equal to 1 and less than or equal to 1000. Further, the one or more polycarbonates 124 can also comprise the fourth functional group, which can be derived from the chemical base.

Moreover, the fourth polymerization scheme 126 can exemplify that one or more thiourea anion catalysts 108 can also be utilized to polymerize the one or more cyclic carbonate monomers 104 and produce the one or more polycarbonates 124. As shown in the fourth polymerization scheme 126, "n" can be an integer ranging, for example, from greater than or equal to 1 and less than or equal to 1000.

Further, while FIG. 1 depicts the use of lactone monomers 102 and/or cyclic carbonate monomers 104 in ROPs with one or more urea anion catalysts 106 and/or one or more thiourea anion catalysts 108 in one or more flow reactors 100 to produce one or more polyesters 111 and/or polycarbonates 124, the architecture of the ROPs is not so limited. For example, the one or more urea anion catalysts 106, one or more thiourea anion catalysts 108, and/or one or more flow reactors 100 can be utilized with various other types of cyclic monomers to produce one or more polyesters 111 and/or polycarbonates 124. Example cyclic monomers that can be utilized to practice the one or more embodiments described herein can include, but are not limited to: lactone monomers 102, cyclic carbonate monomers 104, substituted cyclic carbonates, cyclic phospholane monomers, morpholinone monomers, tetrahydro-2H-pyran-2-thione, oxepane-2-thione, tetrahydrothiopyranone, 2-thiepanone, derivatives thereof, combinations thereof, and/or the like.

In one or more embodiments, the polymerization schemes depicted in FIG. 1 can be performed via a continuous flow of chemical reactants through the one or more flow reactors 100. Also, for each of the polymerization schemes depicted in FIG. 1, polymerization conditions (e.g., residence time within the flow reactor 100, molecular weight distribution of one or more polyesters 111, transesterification of the one or more polyesters' 111 molecular backbone, reaction rate of the one or more ROPs, a combination thereof, and/or like) can be dependent on one or more parameters of the flow reactor 100. Example parameters that can influence polymerization conditions can include, but are not limited to: length of the one or more channels 114, number of reactor loops 116, dimensions of the reactor loops 116, flow rate of the stream of chemical reactants, structure of a chemical mixer, a combination thereof, and/or like. For instance, a degree of mixing between the chemical reactants in the stream housed by the flow reactor 100 (e.g., via the one or more channels 114) can directly influence the molecular weight distribution of the products (e.g., the one or more polyesters 111 and/or the one or more polycarbonates 124). The degree of mixing can be function of turbulence generated within the stream as it flows through the flow reactor 100 and can be influenced by parameters such as internal structure of the one or more channels 114 and/or the flow rate of the stream.

Figure 2A:
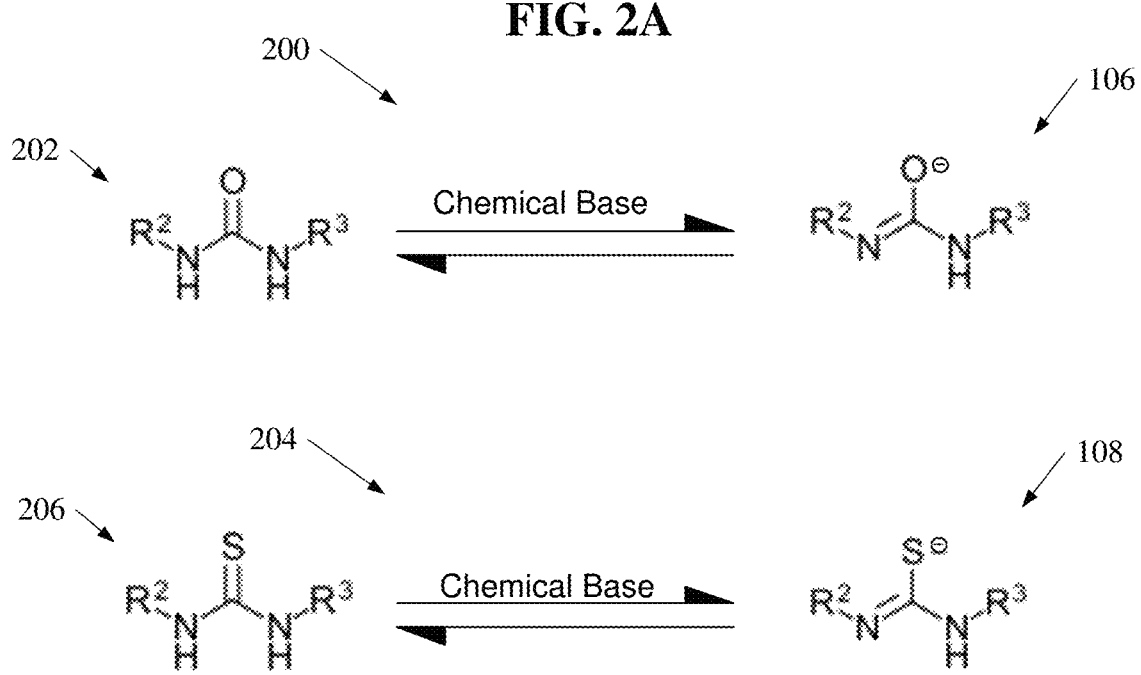
FIG. 2A illustrates a diagram of example, non-limiting deprotonation schemes that can form one or more anionic catalysts, which can facilitate one or more ring-opening polymerizations within one or more flow reactors in accordance with one or more embodiments described herein.

FIG. 2A illustrates a diagram of example, non-limiting deprotonation schemes that can facilitate activation and/or formation of the one or more urea anion catalysts 106 and/or the one or more thiourea anion catalysts 108 in accordance with one or more embodiments described herein. Repetitive description of like elements employed in other embodiments described herein is omitted for sake of brevity. The deprotonations depicted via the deprotonation schemes of FIG. 2A can be performed at room temperature. Further, the deprotonations depicted via the deprotonation schemes of FIG. 2A can be performed inside and/or outside the one or more channels 114 of the one or more flow reactors 100.

As shown in FIG. 2A, the first deprotonation scheme 200 can facilitate activation and/or formation of the one or more urea anion catalysts 106. In the first deprotonation scheme 200, one or more urea chemical compounds 202 can be subject to deprotonation to form the one or more urea anion catalysts 106. The one or more urea chemical compounds 202 can be electrically neural (e.g., non-ionic). Further, the one or more urea chemical compounds 202 can comprise one or more urea groups bonded to the one or more second functional groups (e.g., represented by "$R^2$") and/or the one or more third functional groups (e.g., represented by "$R^3$" again). The deprotonation depicted in the first deprotonation scheme 200 can be a quantitative, relative to the chemical base, deprotonation by the chemical base (e.g., wherein the chemical base is a strong metal-containing base, such as potassium methoxide) or can be a partial deprotonation by the chemical base (e.g., wherein the chemical base is an organic base, such as DBU). Example urea chemical compounds 202 from which the one or more urea anion catalysts 106 can be derived, in accordance with the first deprotonation scheme 200, can include, but are not limited to: 1,3-bis[3,5-bis(trifluoromethyl)phenyl]urea; 1-[3,5-bis(trifluoromethyl)phenyl]-3-[2-(trifluoromethyl)phenyl]urea; 1-[3,5-bis(trifluoromethyl)phenyl]-3-phenylurea; 1-[3,5-bis(trifluoromethyl)phenyl]-3-cyclohexylurea, 1-phenyl-3-[3-(trifluoromethyl)phenyl]urea; 1,3-diphenylurea; and/or 1-cyclohexyl-3-phenylurea.

Figure 2B:
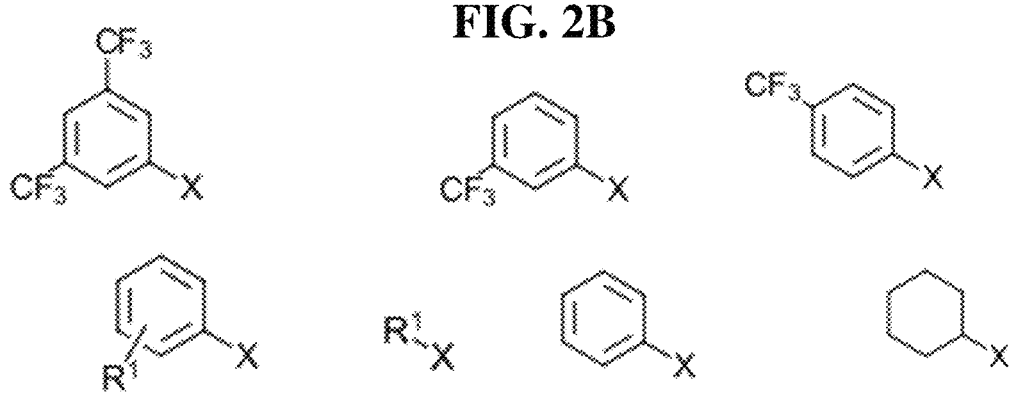
FIG. 2B illustrates a diagram of example, non-limiting functional groups that can be comprised within one or more anionic catalysts, which can facilitate one or more ring-opening polymerizations within one or more flow reactors in accordance with one or more embodiments described herein.

As shown in FIG. 2A, the second deprotonation scheme 204 can facilitate activation and/or formation of the one or more thiourea anion catalysts 108. In the second deprotonation scheme 204, one or more thiourea chemical compounds 206 can be subject to deprotonation to form the one or more thiourea anion catalysts 108. The one or more thiourea chemical compounds 206 can be electrically neural (e.g., non-ionic). Further, the one or more thiourea chemical compounds 206 can comprise one or more thiourea groups bonded to the one or more second functional groups (e.g., represented by "$R^2$" again) and/or the one or more third functional groups (e.g., represented by "$R^3$" again). The deprotonation depicted in the second deprotonation scheme 204 can be a quantitative, relative to the chemical base, deprotonation by the chemical base (e.g., wherein the chemical base is a strong metal-containing base, such as potassium methoxide) or can be a partial deprotonation by the chemical base (e.g., wherein the chemical base is an organic base, such as DBU). Example thiourea chemical compounds 206 from which the one or more thiourea anion catalysts 108 can be derived, in accordance with the second deprotonation scheme 204, can include, but are not limited to: N,N'-di[3,5-di(trifluoromethyl)phenyl]thiourea; 1-[3,5-bis(trifluoromethyl)phenyl]-3-[3-(trifluoromethyl)phenyl] thiourea; 1-[3,5-bis(trifluoromethyl)phenyl]-3-phenylthiourea; 1-[3,5-bis(trifluoromethyl)phenyl]-3-cyclohexylthiourea; 1-phenyl-3-[3-(trifluoromethyl)phenyl] thiourea; N,N'-diphenylthiourea; and/or 1-cyclohexyl-3-phenylthiourea FIG. 2B illustrates a diagram of example, non-limiting functional groups that can characterize the structure of the one or more second functional groups (e.g., represented by "$R^2$") and/or the one or more third functional groups (e.g., represented by "$R^3$") in accordance with one or more embodiments described herein. Repetitive description of like elements employed in other embodiments described herein is omitted for sake of brevity. As shown in FIG. 2B, "X" can represent a urea group and/or a thiourea group comprised within the one or more urea chemical compounds 202, the one or more urea anion catalysts 106, the one or more thiourea chemical compounds 206, and/or the one or more thiourea anion catalysts 108. The chemical structures depicted in FIG. 2B can characterize the one or more first functional groups (e.g., represented by "$R^1$"), second functional groups (e.g., represented by "$R^2$"), and/or the one or more third functional groups (e.g., represented by "$R^3$").

Figure 2C:
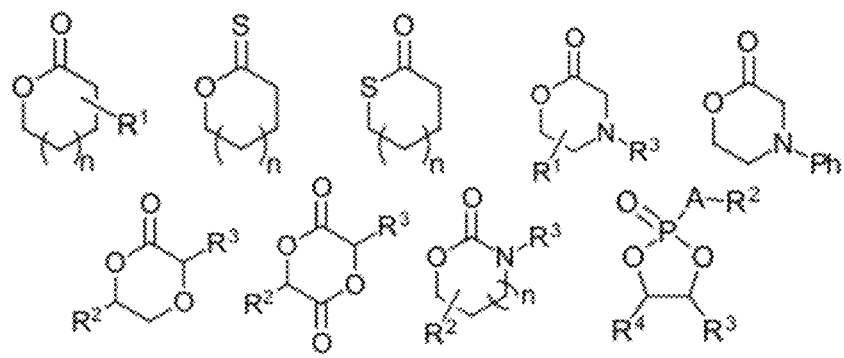
FIG. 2C illustrates a diagram of example, non-limiting cyclic monomers that can be polymerized with one or more urea anion catalysts and/or one or more thiourea anion catalysts to facilitate one or more ring-opening polymerizations within one or more flow reactors in accordance with one or more embodiments described herein.

FIG. 2C illustrates a diagram of example, non-limiting cyclic monomers that can be polymerized with one or more urea anion catalysts 106 and/or one or more thiourea anion catalysts 108 to facilitate one or more ROPs within one or more flow reactors in accordance with one or more embodiments described herein. Repetitive description of like elements employed in other embodiments described herein is omitted for sake of brevity. FIG. 2C depicts exemplary cyclic monomers, in addition to the one or more lactone monomers 102 and/or cyclic carbonate monomers 104, that can undergo ROPs within one or more flow reactors 100 to synthesize one or more polymers through the use of the one or more urea anion catalysts 106 and/or thiourea anion catalysts 108 in accordance with the various embodiments described herein.

As shown in FIG. 2C, "n" can be an integer that is greater than or equal to one (e.g., 1 or 2). Moreover, "A" can represent a carbon bonded to the second functional group (e.g., $CR^2$), an oxygen, and/or a nitrogen bonded to the second functional group (e.g., $NR^2$). In one or more embodiments, the cyclic monomers can have five-member rings.

For instance, the one or more cyclic monomers can include, but are not limited to: lactone monomers 102, cyclic carbonate monomers 104, substituted cyclic carbonates, cyclic phospholane monomers, morpholinone monomers, tetrahydro-2H-pyran-2-thione, oxepane-2-thione, tetrahydrothiopyranone, 2-thiepanone, derivatives thereof, combinations thereof, and/or the like. One of ordinary skill in the art will recognize that the chemical structure for the one or more cyclic monomers shown in FIG. 2C is exemplary and the one or more cyclic monomers can be characterized by a wide variety of chemical structures.

In one or more embodiments, the one or more features of the ROPs depicted in FIGS. 1, 2A, and/or 2B (e.g., ROP comprising urea anion catalysts 106 and/or thiourea anion catalysts 108 within one or more flow reactors 100) can be utilized with the various cyclic monomers depicted in FIG. 2C to produce a variety of polymers (e.g., homopolymers and/or copolymers). For example, the ROPs described in the various embodiments herein can produce polythioesters, polyamides, and/or polyphosphoesters in addition to the polyesters 111 and/or polycarbonates 124. Additionally, these polythioesters, polyamides, and/or polyphosphoesters chemical products can comprise the fourth functional group (e.g., "$R^4$") described herein. For instance, one of ordinary skill in the art will recognize that the various cyclic monomers described herein (e.g., depicted in FIG. 2C) can polymerize (e.g., in the presence of a urea anion catalyst 106 and/or a thiourea anion catalyst 108), within the one or more flow reactors 100, along a carbonyl oxygen and/or carbonyl-thiol bond that breaks during the ROP, thereby producing a growing oxygen-hydrogen ("OH") or sulfur-hydrogen ("SH") structure.

Figure 3:
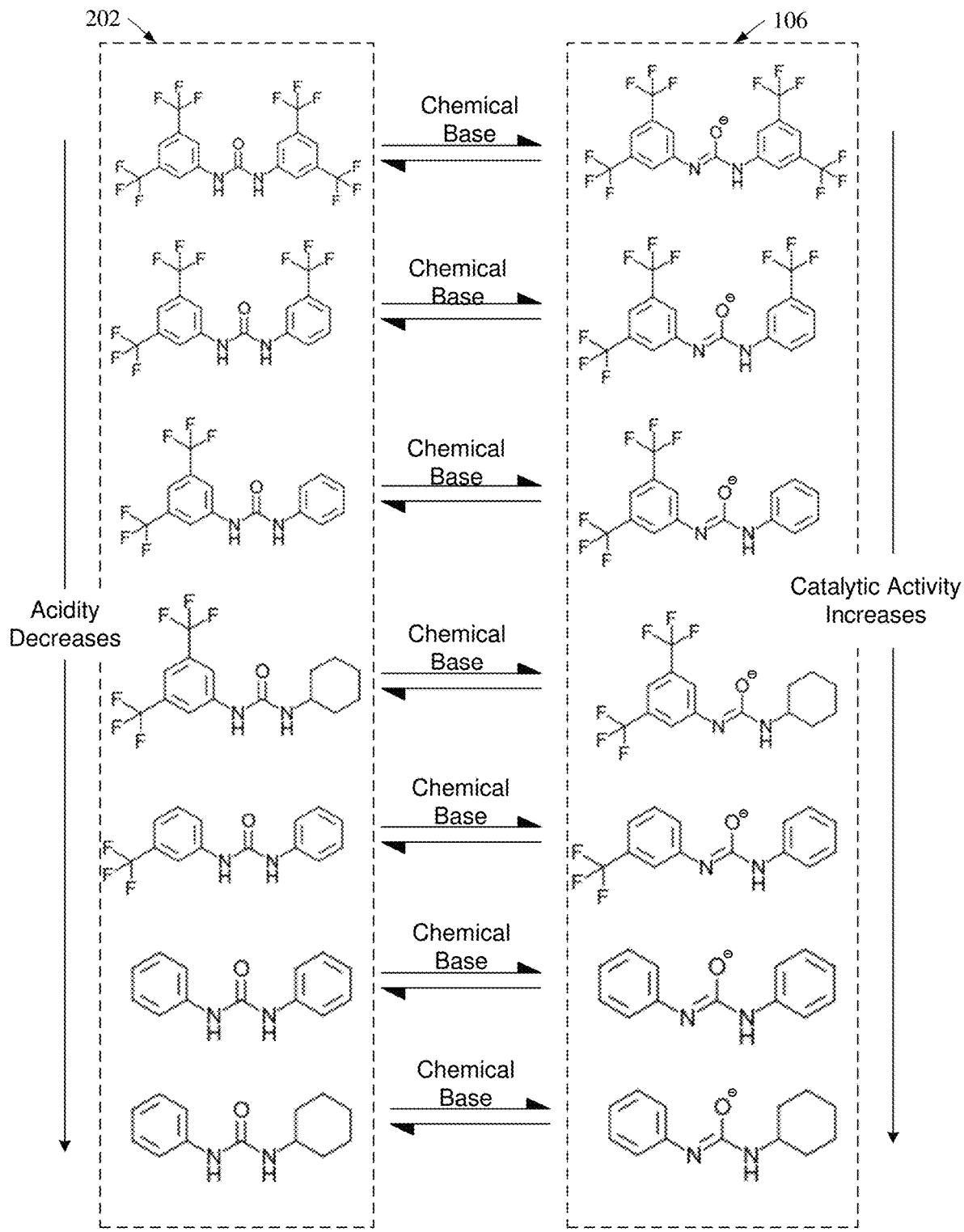
FIG. 3 illustrates a diagram of example, non-limiting deprotonation reactions that can form one or more urea anion catalysts, which can facilitate one or more ring-opening polymerizations within one or more flow reactors in accordance with one or more embodiments described herein.

FIG. 3 illustrates a diagram of example, non-limiting deprotonation reactions that can facilitate activation and/or formation of the one or more urea anion catalysts 106 in accordance with one or more embodiments described herein. Repetitive description of like elements employed in other embodiments described herein is omitted for sake of brevity. For example, the deprotonations depicted in FIG. 3 can exemplify the features depicted and/or described with regards to FIGS. 2A, 2B, and/or 2C.

As indicated by an arrow flanking the left side of FIG. 3, the example urea chemical compounds 202 are presented in order by decreasing acidity from the top of FIG. 3 to the bottom of FIG. 3. For example, 1,3-bis[3,5-bis(trifluoromethyl)phenyl]urea is the most acidic urea chemical compound 202 presented in FIG. 3 and is thereby located at the top of FIG. 3; whereas 1-cyclohexyl-3-phenylurea is the least acidic urea chemical compound 202 presented in FIG. 3 and is thereby presented at the bottom of FIG. 3. As indicated by an arrow flanking the right side of FIG. 3, the exemplary urea anion catalysts 106 are presented in order by increasing catalytic activity (e.g., with regards to at least the ROPs characterized by the first polymerization scheme 109 and the third polymerization scheme 122) from the top of FIG. 3 to the bottom of FIG. 3. For example, the urea anion catalyst 106 derived from 1,3-bis[3,5-bis(trifluoromethyl) phenyl] urea exhibits the least catalytic activity of the urea anion catalysts 106 presented in FIG. 3 and is thereby located at the top of FIG. 3; whereas the thiourea anion catalyst 108 derived from 1-cyclohexyl-3-phenylurea exhibits the most catalytic activity of the urea anion catalysts 106 presented in FIG. 3 and is thereby presented at the bottom of FIG. 3. Thus, as illustrated in FIG. 3, as acidity of the one or more urea chemical compounds 202 decreases, the catalytic activity of the corresponding urea anion catalysts 106 increases.

Amongst the plurality of urea anion catalysts 106 presented in FIG. 3, a difference between the catalytic activity of the most reactive urea anion catalyst 106 and the least reactive urea anion catalyst 106 can reach up to ten orders of magnitude. Thus, the one or more polymerization schemes described herein (e.g., first polymerization scheme 109 and/or third polymerization scheme 122) can use one or more urea anion catalysts 106 based on the cyclic monomer being polymerized. For example, the selection of a urea anion catalyst 106 to be utilized in a subject ROP can be catered to cyclic monomers of different reactivity and/or stability. Therefore, one or more polymerization conditions (e.g., conversion rate and/or molecular weight dispersity) can be adjusted by varying the urea anion catalyst 106 identity and/or concentration without changing one or more parameters of the flow reactor 100.

Figure 4:
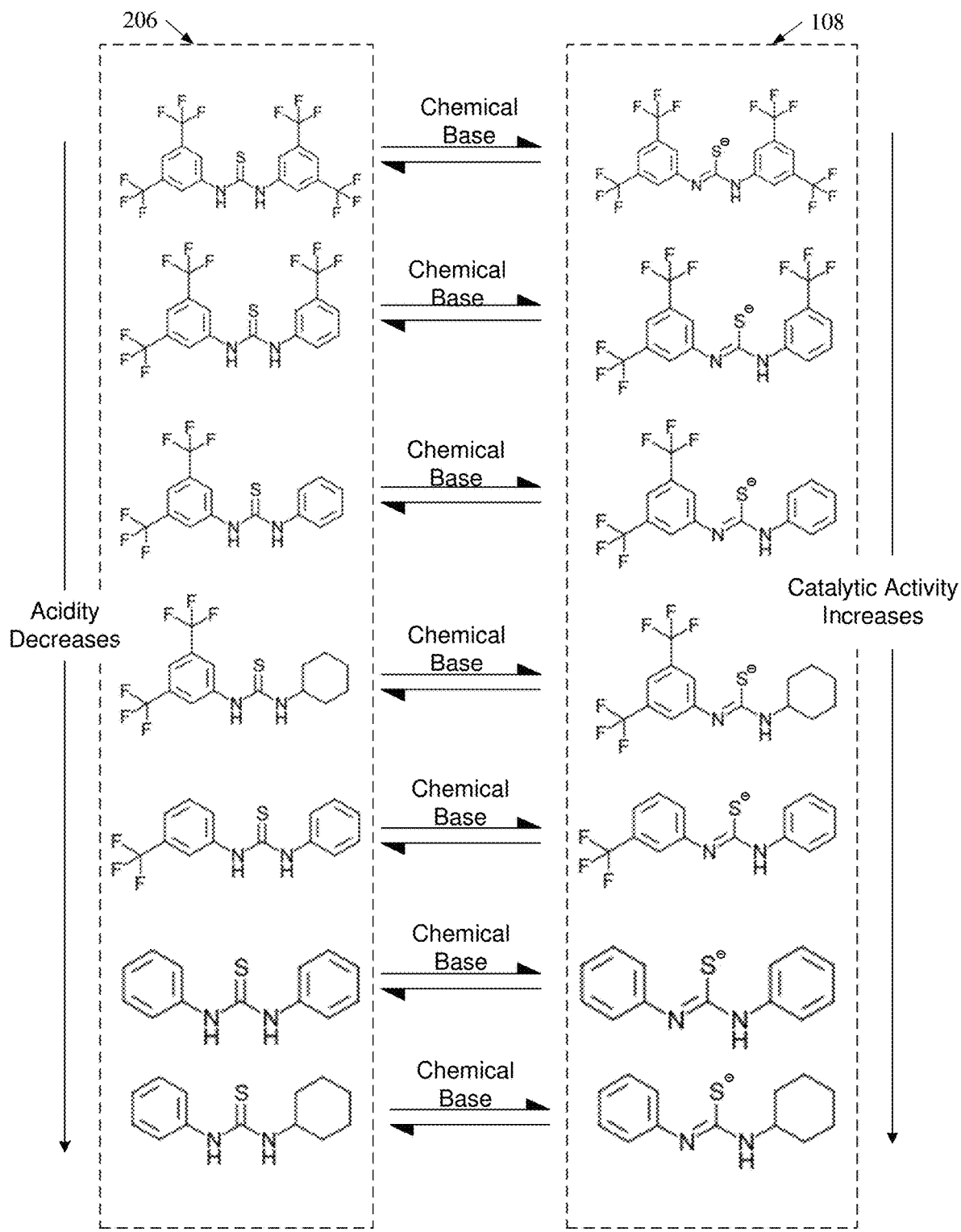
FIG. 4 illustrates a diagram of example, non-limiting deprotonation reactions that can form one or more thiourea anion catalysts, which can facilitate one or more ring-opening polymerizations within one or more flow reactors in accordance with one or more embodiments described herein.

FIG. 4 illustrates a diagram of example, non-limiting deprotonation reactions that can facilitate activation and/or formation of the one or more thiourea anion catalysts 108 in accordance with one or more embodiments described herein. Repetitive description of like elements employed in other embodiments described herein is omitted for sake of brevity. For example, the deprotonations depicted in FIG. 4 can exemplify the features depicted and/or described with regards to FIGS. 2A, 2B, and/or 2C.

As indicated by an arrow flanking the left side of FIG. 4, the example thiourea chemical compounds 206 are presented in order by decreasing acidity from the top of FIG. 4 to the bottom of FIG. 4. For example, N,N'-di[3,5-di(trifluoromethyl)phenyl]thiourea is the most acidic thiourea chemical compound 206 presented in FIG. 4 and is thereby located at the top of FIG. 4; whereas 1-cyclohexyl-3-phenylthiourea is the least acidic thiourea chemical compound 206 presented in FIG. 4 and is thereby presented at the bottom of FIG. 4. As indicated by an arrow flanking the right side of FIG. 4, the exemplary thiourea anion catalysts 108 are presented in order by increasing catalytic activity (e.g., with regards to at least the ROPs characterized by the second polymerization scheme 120 and the fourth polymerization scheme 126) from the top of FIG. 4 to the bottom of FIG. 4. For example, the thiourea anion catalyst 108 derived from N,N'-di[3,5-di(trifluoromethyl)phenyl]thiourea exhibits the least catalytic activity of the thiourea anion catalysts 108 presented in FIG. 4 and is thereby located at the top of FIG. 4; whereas the thiourea anion catalyst 108 derived from 1-cyclohexyl-3-phenylthiourea exhibits the most catalytic activity of the thiourea anion catalysts 108 presented in FIG. 4 and is thereby presented at the bottom of FIG. 4. Thus, as illustrated in FIG. 4, as acidity of the one or more thiourea chemical compounds 206 decreases, the catalytic activity of the corresponding thiourea anion catalysts 108 increases.

Amongst the plurality of thiourea anion catalysts 108 presented in FIG. 4, a difference between the catalytic activity of the most reactive thiourea anion catalyst 108 and the least reactive thiourea anion catalyst 108 can reach up to ten orders of magnitude. Thus, the one or more polymerization schemes described herein (e.g., second polymerization scheme 120 and/or fourth polymerization scheme 126) can use one or more thiourea anion catalysts 108 based on the cyclic monomer being polymerized. For example, the selection of a thiourea anion catalyst 108 to be utilized in a subject ROP can be catered to cyclic monomers of different reactivity and/or stability. Therefore, one or more polymerization conditions (e.g., conversion rate and/or molecular weight dispersity) can be adjusted by varying the thiourea anion catalyst 108 identity and/or concentration without changing one or more parameters of the flow reactor 100.

Figure 5:
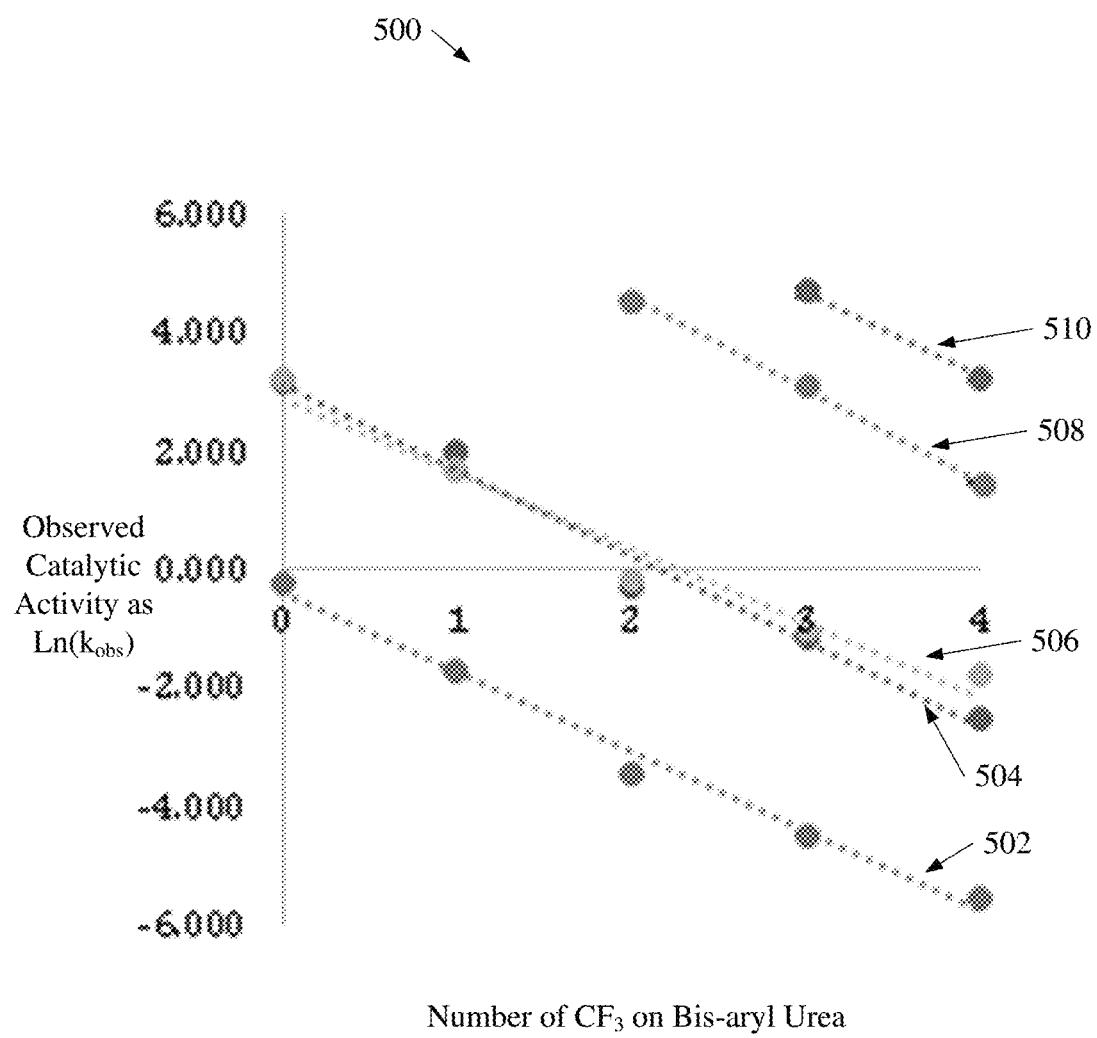
FIG. 5 illustrates a diagram of an example, non-limiting chart that can depict a relationship between acidity and catalytic activity regarding one or more anionic catalysts, which can facilitate one or more ring-opening polymerizations within one or more flow reactors in accordance with one or more embodiments described herein.

FIG. 5 illustrates a diagram of an example, non-limiting graph 500 that can depict a relationship between the acidity of urea anion catalysts 106 and the catalytic activity of the urea anion catalysts 106 in accordance with one or more embodiments described herein. Repetitive description of like elements employed in other embodiments described herein is omitted for sake of brevity. Acidity of the urea anion catalysts 106 (e.g., and/or the thiourea anion catalysts 108) can be a function of the number of trifluoromethyl groups comprised within the urea anion catalyst 106; wherein the higher the number of trifluoromethyl groups present, the higher the acidity of the urea anion catalyst 106 (e.g., and/or the thiourea anion catalyst 108). As shown in graph 500, the first line 502 can represent the ROP of ε-caprolactone as the lactone monomer 102 with the various exemplary urea anion catalysts 106 presented in FIG. 3 in accordance with the first polymerization scheme 109. The second line 504 can represent the ROP of δ-valerolactone as the lactone monomer 102 with the various exemplar urea anion catalysts 106 presented in FIG. 3 in accordance with the first polymerization scheme 109. The third line 506 can represent the ROP of iPr-phosphonate as the lactone monomer 102 with the various exemplar urea anion catalysts 106 presented in FIG. 3 in accordance with the first polymerization scheme 109. The fourth line 508 can represent the ROP of benzyl 5-methyl-2-oxo-1,3-dioxane-5-carboxylate as the cyclic carbonate monomer 104 with the various exemplar urea anion catalysts 106 presented in FIG. 3 in accordance with the third polymerization scheme 122. The fifth line 510 can represent the ROP of lactide as the lactone monomer 102 with the various exemplar urea anion catalysts 106 presented in FIG. 3 in accordance with the first polymerization scheme 109.

Table 1, presented below, comprises data regarding one or more polymerization conditions for a ROP performed in accordance with the one or more embodiments described herein (e.g., in accordance with the various features and/or descriptions associated with FIGS. 1-3 and 6). For example, Table 1 regards a polymerization performed in accordance with the first polymerization scheme 109, wherein the one or more lactone monomers 102 were δ-valerolactone monomers, the one or more urea anion catalysts 106 were derived from 1-cyclohexyl-3-phenylurea (e.g., as depicted in FIG. 3), and the one or more chemical bases were potassium methoxide.

In particular, a catalytic solution comprising 14 milligrams (mg) of potassium methoxide, 131 mg of the urea anion catalyst 106, and 4.9 milliliters (mL) of tetrahydrofuran ("THF"), was added to a subject flow reactor 100 (e.g., via a first inlet 112). Additionally, a cyclic monomer solution comprising 800 mg of δ-valerolactone and 4 mL of THF was added to the subject flow reactor 100 (e.g., via a second inlet 112). The two solutions were infused into the flow reactor 100 at various flow rates, as indicated in Table 1. The flow reactor 100 output was quenched directly with excess benzoic acid THF. Conversion was measured by proton nuclear magnetic resonance ("$^1$H NMR") of quenched polymer samples. Molecular weight ("$M_n$") was measured in kilodaltons (kDa) by gel permeation chromatography ("GPC") using THF as the eluent and calibrated with polystyrene standards. The ROPs depicted by Table 1 were performed at room temperature. The total flow rate of the stream of chemical reactants (e.g., comprised within both solutions) was measured in milliliters per minute (mL/min). The residence time of the stream of chemical reactants within the flow reactor 100 was measured in seconds (s).

TABLE 1

| Entry | Total Flow Rate (mL/min) | Residence Time (s) | Conversion | $M_n$(kDa) | Đ |
|---|---|---|---|---|---|
| 1 | 0.5 | 10 | 45% | 19 | 1.58 |
| 2 | 1 | 10 | 71% | 17 | 1.60 |
| 3 | 2 | 10 | 90% | 16 | 1.81 |
| 4 | 2 | 5 | 74% | 8.9 | 1.71 |
| 5 | 8 | 5 | 90% | 9.8 | 1.63 |
| 6 | 8 | 0.6 | 79% | 7.3 | 1.58 |
| 7 | 16 | 0.3 | 85% | 7.4 | 1.22 |

TABLE 1-continued

| Entry | Total Flow Rate (mL/min) | Residence Time (s) | Conversion | $M_n$(kDa) | Đ |
|---|---|---|---|---|---|
| 8 | 30 | 0.15 | 49% | 4.9 | 1.13 |
| 9 | 30 | 0.8 | 86% | 7.8 | 1.11 |

As shown in Table 1, lower flow rates led to substantial reductions in reaction rate compared to polymerization in batch, and broad molecular weight distributions of the obtained polymers. Increasing the flow rate led to substantially improved polymerization kinetics and control, thereby matching in-batch counterparts. As such subsequent polymerizations were carried out at flow rates of 15 mL/min per inlet 112.

For example, Table 2, presented below, comprises data regarding one or more polymerization conditions for a ROP performed in accordance with the one or more embodiments described herein (e.g., in accordance with the various features and/or descriptions associated with FIGS. 1-3 and 6). For example, Table 2 regards a polymerization performed in accordance with the first polymerization scheme 109, with a variety of lactone monomers 102, a variety of urea anion catalysts 106, and potassium methoxide used as the chemical base. The cyclic monomers are presented with their molar concentration (M), wherein "LA" represents lactide, "VL" represents δ-valerolactone, "CL" represents ε-Caprolactone, and "TMC-Bn" represents benzyl 5-methyl-2-oxo-1,3-dioxane-5-carboxylate. As shown in Table 2, "[M]/[I]" can represent a ratio of monomer to initiator (e.g., urea anion catalyst 106). Additionally, the polymerizations performed with flow rates of 15 mL/min per inlet 112 at room temperature. Moreover, urea "#3" can represent the urea anion catalyst 106 derived from 1-[3,5-bis(trifluoromethyl)phenyl]-3-phenylurea as shown in FIG. 3, urea "#5" can represent the urea anion catalyst 106 derived from 1-phenyl-3-[3(trifluoromethyl)phenyl]urea as shown in FIG. 3, and urea "#7" can represent the urea anion catalyst 106 derived from 1-cyclohexyl-3-phenylurea as shown in FIG. 3. Further, the initiator solution used in the polymerizations depicted by Table 2 can comprise a chemical base to urea anion catalyst 106 ratio of 1:3; except for entry 3, which had a chemical base to urea anion catalyst 106 ratio of 1:1.5. Moreover, the polymerization of entry 6 utilized a flow rate of 24 mL/min per inlet 112.

TABLE 2

| Entry | Monomer | [M]/[I] | Urea | Residence Time (s) | Conversion | $M_n$ (kDa) | Đ |
|---|---|---|---|---|---|---|---|
| 1 | LA (0.5M) | 25 | 3 | 0.32 | 96% | 5.4 | 1.13 |
| 2 | LA (1M) | 50 | 3 | 0.32 | 98% | 13 | 1.09 |
| 3 | LA (1M) | 50 | 5 | 0.03 | 92% | 14 | 1.09 |
| 4 | LA (1M) | 100 | 3 | 1.3 | 98% | 25 | 1.11 |
| 5 | VL (1M) | 50 | 7 | 0.81 | 86% | 7.8 | 1.11 |
| 6 | CL (1M) | 50 | 7 | 2.3 | 91% | 9.1 | 1.14 |
| 7 | TMC-Bn | 50 | 5 | 0.04 | 89% | 11 | 1.15 |

While batch polymerizations of LA were traditionally performed with the less active urea catalysts, more active urea anion catalysts 106 (e.g., urea #3 and/or #5) can be used in the flow reactor 100 presumably due to more efficient mixing and quenching. In entry 2, the polymerization of LA reached 98% conversion in just 0.32 s to yield poly(LA) with a narrow molecular weight distribution (e.g., Đ=1.09). More extraordinarily, in entry 3 and a reactor length of 3 centimeters (cm) (e.g., 3 cm of the one or more channels 114 extending from the one or more inlets 112 to the one or more outlets 118), the polymerization of LA reached 92% conversion in just 30 milliseconds (ms) with the same degree of control (e.g., Đ=1.09). Such short reaction times together with the high degree of control is not feasible in traditional batch production. For instance, tor VL, a monomer over 250 times less reactive than LA towards ROP, the most catalytically active urea anion catalyst 106 (e.g., urea #7) catalyzed its polymerization to 86% conversion in 0.8 s to generate a well-defined poly(VL) (e.g., Đ=1.11). Using the same catalyst system, the ROP of CL (6200 times less reactive than LA) reached 91% conversion, with control similar to its batch counterpart (e.g., Đ=1.14). With a total flow rates of 30 mL/min or 48 mL/min, each of these reactor setups generates polymers at the rate of multiple grams per minute.

To exemplify one or more features of the polymerizations depicted in FIG. 1, entry 4 of Table 2 was synthesized in accordance with the first polymerization scheme 109 under the following exemplary conditions. In an $N_2$-filled glovebox, a solution of L-LA having a molar concentration of 2 mol/L (M) was prepared by dissolving 1440 mg L-LA in 3.6 mL of THF. A catalyst and initiator solution was prepared by dissolving 7 mg KOMe and 104 mg urea #3 in 4.9 mL THF and then filtered through a syringe filter. Both solutions were transferred to 5-mL syringes respectively. Outside of the glovebox, after dry THF was flowed through the reactor via syringes, the syringes containing the monomer solution and catalyst/initiator solution were connected to the flow reactor 100. The syringe pump was set to a flow rate of 15 mL/min for each inlet 112, and the solutions were combined via a generic 0.0157 cm diameter T-mixer, with a total flow rate of 30 mL/min. The one or more channels 114 (e.g., tubing) to facilitate the polymerization was 60 cm long with a 0.0157 cm diameter, corresponding to a residence time of 1.3 seconds. The polymerization was quenched by directing the reaction mixture into a bath of benzoic acid in THF.

Figure 6:
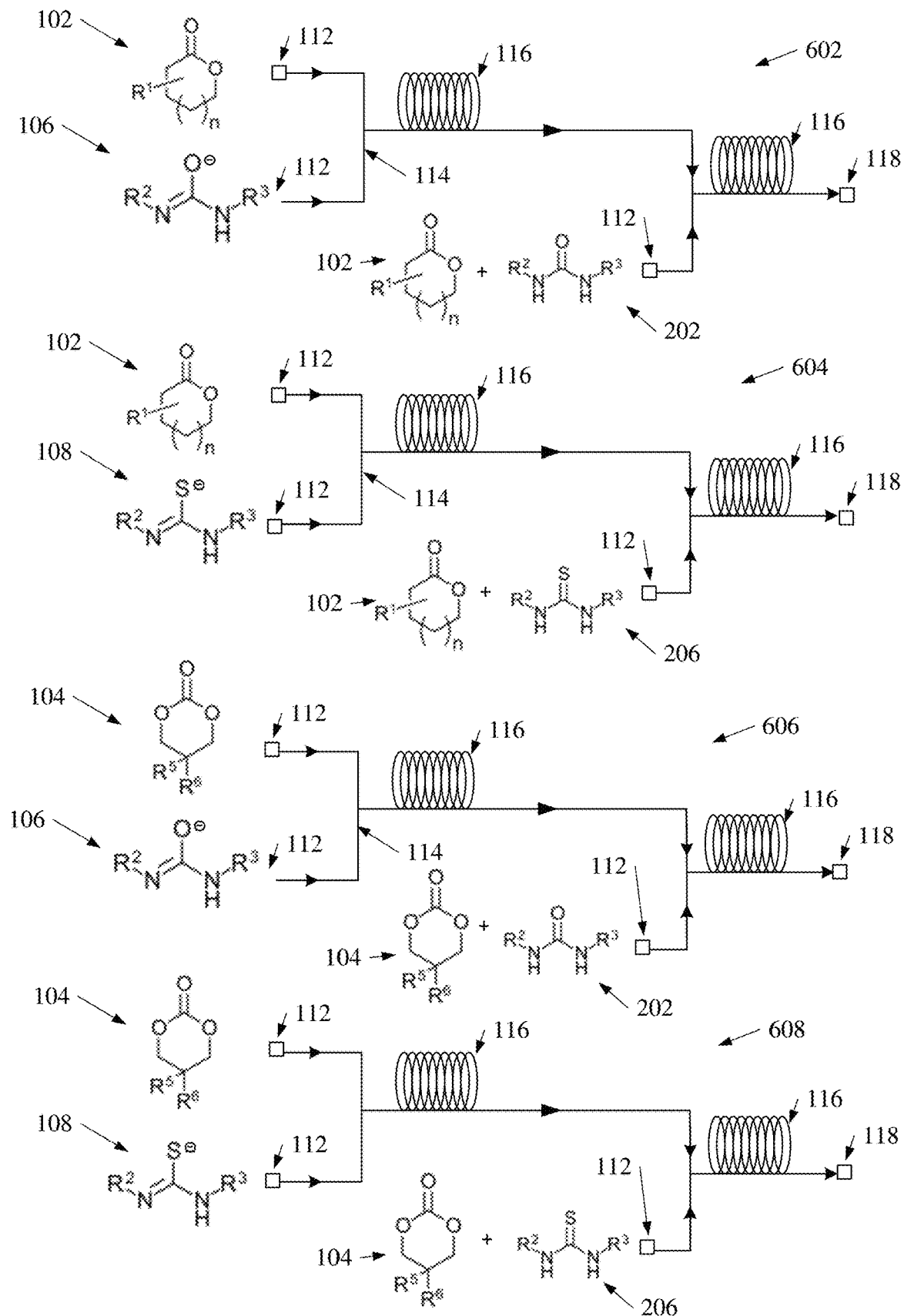
FIG. 6 illustrates a diagram of example, non-limiting polymerization schemes that can facilitate forming one or more block copolymers via one or more ring-opening polymerizations within one or more flow reactors in accordance with one or more embodiments described herein.

FIG. 6 illustrates a diagram of example, non-limiting polymerization schemes that can facilitate synthesis of one or more copolymers (e.g., block copolymers) via one or more ROP conducted within one or more flow reactors 100 in accordance with one or more embodiments described herein. Repetitive description of like elements employed in other embodiments described herein is omitted for sake of brevity. The polymerizations depicted in FIG. 6 comprise many of the same features described with regards to FIG. 1, but with an additional step to facilitate the synthesis of block copolymers. The matching of cyclic monomer and catalyst reactivity enables a catalyst switch approach for block copolymer synthesis using cyclic monomers with disparate reactivity profiles. For example, an active urea anion catalyst 106 for polymerization of the first block is quenched by the addition of a neutral urea chemical compound 202 via a proton transfer to generate a new urea anion catalyst 106 with a different catalytic activity for the polymerization of the second block. In another example, an active thiourea anion catalyst 108 for polymerization of the first block is quenched by the addition of a neutral thiourea chemical compound 206 via a proton transfer to generate a new thiourea anion catalyst 108 with a different catalytic activity for the polymerization of the second block.

The syntheses of well-defined block copolymers can be important for many material applications, including the generation of nanoparticles and functional bioactive polymers. Under traditional batch polymerization conditions, the synthesis of block copolymers with narrow molecular weight distributions can be challenging. The polymerization, isolation, and purification of the block copolymer intermediates can be tedious and time consuming for multi-step synthetic processes. Whereas synthesizing block copolymers in one container relies on the efficient addition and mixing of monomers for each sequential block. The utilization of flow reactors 100 (e.g., via continuous flow polymerization) offers an excellent alternative to traditional batch procedures for the preparation multi-block polymers as the monomers for each block can be seamlessly introduced in sequential stages of one or more flow reactors 100 with highly efficient mixing.

For example, with regards to the fifth polymerization scheme 602, ROP of the one or more lactone monomers 102 and the one or more urea anion catalysts 106 can produce an intermediate polymer that can serve as the first block of a multiblock copolymer. The intermediate polymer can be further polymerized by the introduction of an additional lactone monomer 102. For example, the additional lactone monomer 102 can enter the flow reactor 100 via a third inlet 112 and can mix with a stream of the intermediate polymer in the one or more channels 114 of the flow reactor 100.

Additionally, in one or more embodiments, one or more urea chemical compounds 202 can enter the flow reactor 100 (e.g., via the third inlet 112) to facilitate a switch of the active urea anion catalyst 106. For example, the urea chemical compound 202 can mix in the one or more channels 114 with the urea anion catalyst 106 used to synthesize the intermediate polymer; thereby initiating a proton transfer that can neutralize the urea anion catalyst 106 and ionize the urea chemical compound 202. In effect, introducing the additional urea chemical compound 202 to the stream comprising the intermediate polymer can transform the urea anion catalyst 106 to a urea chemical compound 202 and the additional urea chemical compound 202 to a urea anion catalyst 106; thereby switching the active catalyst from one exemplary urea anion catalyst to another.

The sixth polymerization scheme 604, which can be a modification to the second polymerization scheme 120, can exemplify the catalyst switch using thiourea anion catalysts 108. For example, a first thiourea anion catalyst 108 can facilitate a first ROP of a first lactone monomer 102, which can serve as a first block of a copolymer, and then can be protonated by a thiourea chemical compound 206 in another stage of the flow reactor 100. The protonation can quench the first thiourea anion catalyst 108 and simultaneously form a second thiourea anion catalyst 108 from the thiourea chemical 206, wherein the second thiourea anion catalyst 108 can facilitate a second ROP of a second lactone monomer 102 that can serve as a second block of the copolymer.

Similarly, the seventh polymerization scheme 606 and/or the eighth polymerization scheme 608 can exemplify the catalyst switch techniques with regards to cyclic carbonate monomers 104. One of ordinary skill in the art will recognize that the chemical structure for the one or more lactone monomers 102 shown in FIG. 6 is exemplary and the one or more lactone monomers 102 can be characterized by a wide variety of chemical structures that comprise an ester group as part of a ring formation. Additionally, one of ordinary skill in the art will recognize that the chemical structure for the one or more cyclic carbonate monomers 104 shown in FIG. 6 is exemplary and the one or more cyclic carbonate monomers 104 can be characterized by a wide variety of chemical structures that comprise a carbonate group in a ring formation. In each of the polymerization schemes shown in FIG. 6, "n" can respectively be an integer ranging, for example, that is greater than or equal to zero (e.g., 1 or 2), so as to include five-member rings as well as macrocyclic lactones.

Each of the exemplary polymerization schemes shown in FIG. 6 comprise ROP of respective cyclic monomers (e.g., a first lactone monomer 102 and second lactone monomer 102 in the fifth polymerization scheme 602 and/or the sixth polymerization scheme 604, and/or a first cyclic carbonate monomer 104 and a second cyclic carbonate monomer 104 in the seventh polymerization scheme 606 and/or the eighth polymerization scheme 608), which each respective cyclic monomer in a given polymerization scheme can be characterized by a different chemical structure. Additionally, wherein a polymerization scheme can include a catalyst switch (e.g., as depicted in the polymerization schemes of FIG. 6), the initial anionic organocatalyst (e.g., a urea anion catalyst 106 and/or a thiourea anion catalyst 108) can be derived from a chemical compound (e.g., a urea chemical compound 202 and/or a thiourea chemical compound 206) that is different that the chemical compound (e.g., a urea chemical compound 202 and/or a thiourea chemical compound 206) introduced into the flow reactor 100 to facilitate the catalyst switch. In one or more embodiments, the polymerization schemes depicted in FIG. 6 can be performed via a continuous flow of chemical reactants through the one or more flow reactors 100.

In one or more embodiments, the one or more of the polymerization schemes depicted in FIG. 6 can include a ROP of a lactone monomer 102 to form one block of a copolymer and/or another ROP of a cyclic carbonate monomer 104 to form another block of the copolymer. Also, in one or more embodiments, an initial urea anion catalyst 106 can be protonated by a thiourea chemical compound 206; thereby facilitating a catalyst switch from a urea anion catalyst 106 to a thiourea anion catalyst 108. Further, in one or more embodiments an initial thiourea anion catalyst 108 can be protonated by a urea chemical compound 202; thereby facilitating a catalyst switch from a thiourea anion catalyst 108 to a urea anion catalyst 106.

Figure 7A:
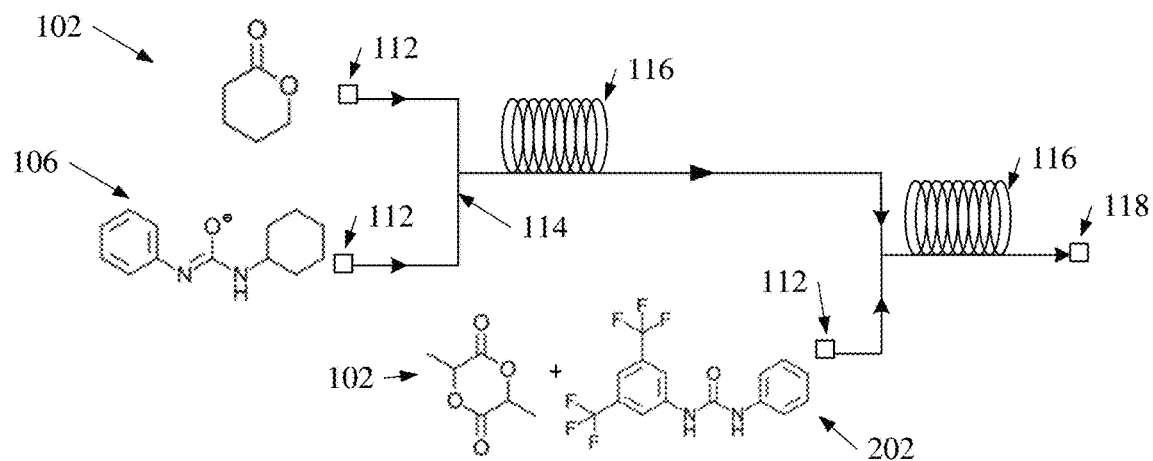
FIG. 7A illustrates a diagram of an example, non-limiting polymerization that can facilitate forming one or more block copolymers via one or more ring-opening polymerizations within one or more flow reactors in accordance with one or more embodiments described herein.

FIG. 7A illustrates a diagram of an example, non-limiting polymerization that can be performed in accordance with the fifth polymerization scheme 602 and/or in accordance with one or more embodiments described herein. Repetitive description of like elements employed in other embodiments described herein is omitted for sake of brevity. In one or more embodiments, the polymerization of FIG. 7A can be performed at room temperature and/or in a continuous flow of the chemical reactants in a stream through the one or more flow reactors 100.

Figure 7B:
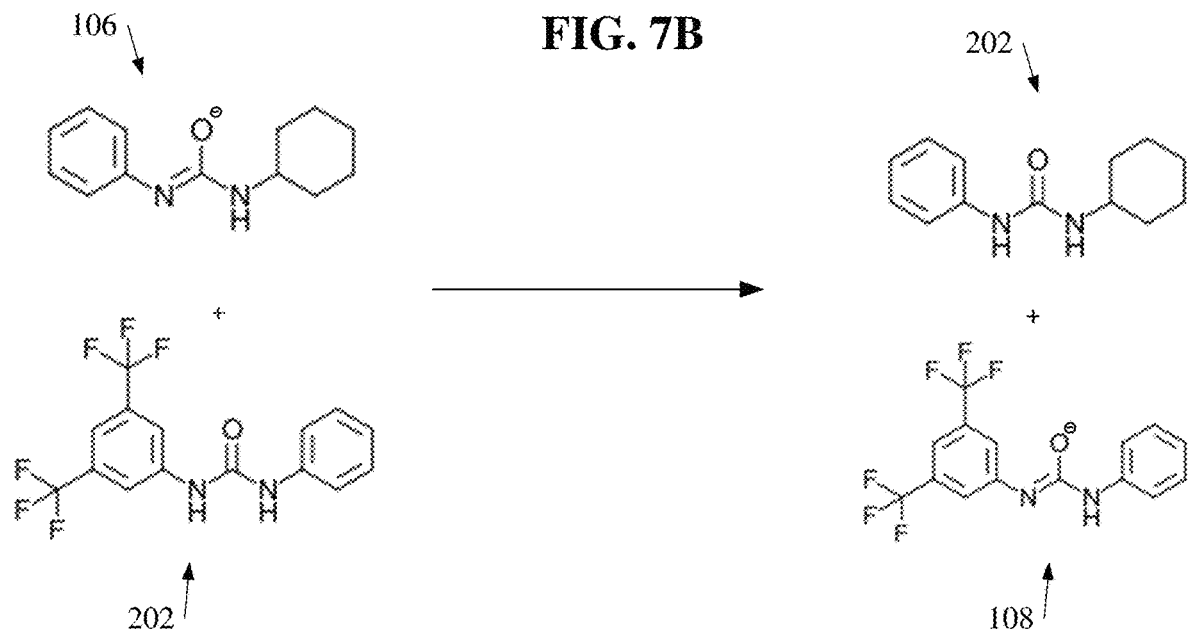
FIG. 7B illustrates a diagram of an example, non-limiting proton transfer that can facilitate switching from one urea anion catalyst to another urea anion catalyst to facilitate multiple ring-opening reactions within one or more flow reactors in accordance with one or more embodiments described herein.

FIG. 7B illustrates a diagram of an example, non-limiting protonation t that can occur in the polymerization depicted in FIG. 7A in accordance with one or more embodiments described herein. Repetitive description of like elements employed in other embodiments described herein is omitted for sake of brevity. FIG. 7B can depict an exemplary catalyst switch that can facilitate the polymerization depicted in FIG. 7A. Because the active catalysts are anions, they can be protonated by neutral urea chemical compounds 202 and/or neutral thiourea chemical compounds 206, the equilibrium of which can be dictated by their relative acidities. Therefore, adding a more acidic urea chemical compound 202 and/or thiourea chemical compound 206 (e.g., 1-[3,5-bis (trifluoromethyl)phenyl]-3-phenylurea) to the anion of a more basic urea anion catalyst 106 and/or thiourea anion catalyst 108 will protonate the more basic anion, and simultaneously generate a less active urea anion catalyst 106 and/or thiourea anion catalyst 108 (e.g., as shown in FIG. 7B), allowing for matching of the catalyst and monomer reactivity.

In traditional ROPs, a main challenge can exist when the blocks are made from monomers with very different reactivity. For example, the rate of LA polymerization has been observed to be ~250 times faster than VL. For instance, the use of a single urea anion catalyst 106 in flow for the synthesis of a $VL_{50}$-$LA_{50}$ block copolymer, would result in the residence time for the VL block being over 2 orders of magnitude longer than the LA block. This would potentially allow for transesterification of the polymer backbone as a result of using increased residence times and a more active urea anion catalyst 106. However, the acidity-based reactivity of the urea anion catalysts 106 and/or the thiourea anion catalysts 108 can overcome these challenges. More acidic urea anions lead to slower reactions, which was proposed to be due to the weaker nucleophilic activation of the initiator or propagating chain end. By selecting the appropriate catalysts for each cyclic monomer, comparable retention time of the blocks can be achieved and transesterification can be minimized. Since proton exchange should be much faster compared to the ring-opening of monomers, the urea chemical compound 202 and/or the thiourea chemical compound 206 for the subsequent block can be injected into the reactor with the cyclic monomer, instead of through an additional dedicated inlet 112.

Table 3 presents data regarding the polymerization of poly($VL_{50}$)-b-($LA_{50}$) depicted in FIG. 7A as compared to polymerization of the block copolymer under alternative polymerization conditions. The flow rate for the polymerization was 15 mL/min per inlet 112. The diameter of the one or more channels 114 of the one or more flow reactors 100 were 1 millimeter (mm). The conversion depicted in Table 3 was measured by $^1H$ NMR. Further, the first block was prepared using a ratio of potassium methoxide:urea #7:VL equal to 1:3:50. The reaction time for the VL block was 0.81 s and the reaction time for the LA block was 0.43 s for a total of 1.24 s. Also, the molarity of VL for the first block was 1 M, and the molarity of LA for the second block was 2 M.

TABLE 3

| Entry | Conditions | Conversion (VL) | Conversion (LA) | $M_n$ (kDa) | Đ |
|---|---|---|---|---|---|
| 1 | In flow; catalyst switch | 88% | 93% | 23 | 1.11 |
| 2 | In flow; no catalyst switch | 88% | 97% | 15 | 1.36 |
| 3 | In batch; catalyst switch | 87% | 96% | 22 | 1.21 |

As shown in Table 3, the synthesis of a poly($VL_{50}$)-b-poly-($LA_{50}$) copolymer using the catalyst switch strategy generated (e.g., as depicted in FIG. 7A) a well-defined copolymer with a narrow molecular weight distribution (e.g. Đ=1.11). In contrast, when no catalyst switch was employed, a much broader molecular weight distribution was obtained (e.g. Đ=1.36). The catalyst switch mechanism was also attempted in batch using conditions similar to those in entry 1. However, a broader molecular weight distribution was obtained due to the very short reaction time (e.g., less than 1.5 s), where the manual addition of the solutions and mixing can be problematic (e.g. Đ=1.21). Scaling up in batch production under these conditions would not be ideal (e.g., due to poorer mixing in larger scale reactors).

To exemplify one or more features of the polymerizations depicted in FIG. 6, entry 1 of Table 3 was synthesized in accordance with the fifth polymerization scheme 602 under the following exemplary conditions. In an $N_2$-filled glovebox, a 2 M solution of VL was prepared by dissolving 1000 mg of VL in 4 mL THF. A catalyst and initiator solution was prepared by dissolving 7 mg of KOMe and 131 mg of urea #7 in 4.9 mL THF and then filtered through a syringe filter. A solution of L-LA and urea #3 was prepared by dissolving 1440 mg of L-LA and 208 mg of urea #3 in 3.4 mL of THF. All the solutions were transferred to 5-mL syringes respectively. Outside of the glovebox, after dry THF were flowed through the flow reactor via syringe injections, the syringes containing the VL solution, the catalyst/initiator solution and the LA/urea #3 solutions were connected to the flow reactor 100. The syringe pump was set to a flow rate of 15 mL/min for each inlet, and the solutions were combined via two generic 0.0157 cm diameter T-mixers, with a final total flow rate of 45 mL/min. The one or more channels 114 for VL polymerization is 50 cm long with a 0.81 s residence time, and the one or more channels 114 for LA polymerization is 70 cm long with a 0.0157 cm diameter, corresponding a residence time of 0.76 second. The polymerization was quenched by directing the reaction mixture into a bath of benzoic acid in THF (equipped with a stir bar).

Figure 8:
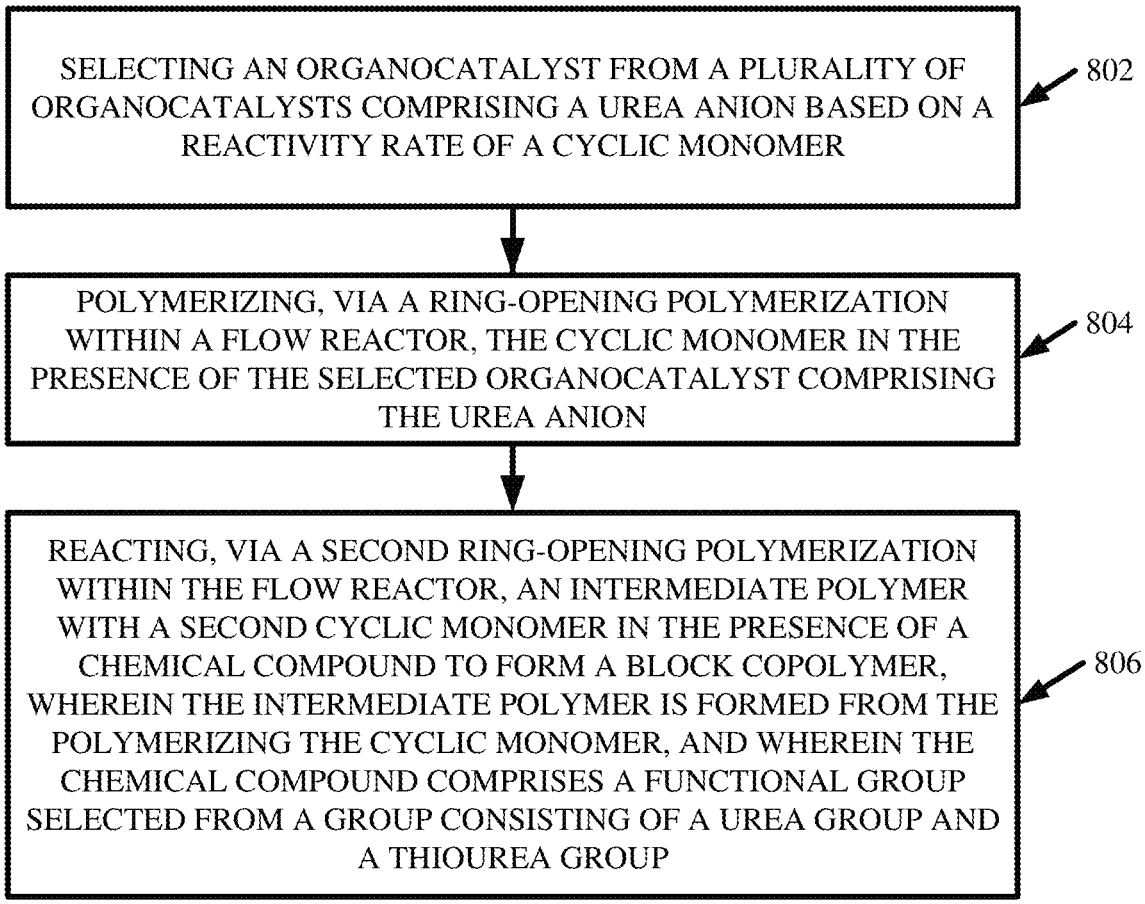
FIG. 8 illustrates a flow diagram of an example, non-limiting method that can facilitate forming a block copolymer via a plurality of ring-opening polymerization within one or more flow reactors, wherein the plurality of ring-opening polymerizations can be facilitated by a changing an active catalyst from a first urea anion catalyst to a second urea anion catalyst in accordance with one or more embodiments described herein.

FIG. 8 illustrates a flow diagram of an example, non-limiting method 800 that can facilitate the polymerization of polymers (e.g., homopolymers and/or block copolymers) via one or more ROP in one or more flow reactors 100 in accordance with one or more embodiments described herein. Repetitive description of like elements employed in other embodiments described herein is omitted for sake of brevity.

At 802 the method 800 can comprise selecting one or more organocatalysts from a plurality of organocatalysts comprising a urea anion based on a reactivity rate of one or more cyclic monomers. For example, the one or more selected organocatalyst can be urea anion catalysts 106. Further, the one or more cyclic monomers can be lactone monomers 102, cyclic carbonate monomers 104, and/or the cyclic monomers depicted in FIG. 2C. For instance, the plurality of organocatalysts (e.g., plurality of urea anion catalysts 106) can be characterized be differing respective catalytic activities. In other words, a first organocatalyst (e.g., a first urea anion catalyst 106) from the plurality of organocatalysts (e.g., from the plurality of urea anion catalysts 106) can be more reactive than a second organocatalyst (e.g., a second urea anion catalyst 106) from the plurality of organocatalysts (e.g., from the plurality of urea anion catalysts 106). Thus, the selecting at 802 can comprise selecting an organocatalyst (e.g., a urea anion catalyst 106) with similar reactivity as the subject one or more cyclic monomers.

At 804, the method 800 can comprise polymerizing, via a ROP within one or more flow reactors 100, the one or more cyclic monomers in the presence of the selected one or more organocatalysts comprising the urea anion (e.g., the one or more selected urea anion catalysts 106). For example, the one or more selected organocatalysts can be one or more of the exemplary urea anion catalysts 106 presented in FIG. 3.

In one or more embodiments (e.g., regarding the polymerization of one or more block copolymers), the method 800 can further comprise, at 806, reacting, via a second ROP within the flow reactor 100, an intermediate polymer with a second cyclic monomer (e.g., a lactone monomer 102 and/or a cyclic carbonate monomer 104) in the presence of a chemical compound (e.g., a urea chemical compound 202 and/or a thiourea chemical compound 206) to form a block copolymer, wherein the intermediate polymer is formed from the polymerizing at 804, and wherein the chemical compound can comprise a functional group selected from a group consisting of a urea group and/or a thiourea group. The reacting at 806 can comprise protonating the urea anion via a proton transfer with the functional group to form an anionic organocatalyst (e.g., another urea anion catalyst 106), wherein the anionic organocatalyst can be a catalyst to the second ROP. Additionally, the method 800 can comprise injecting the second cyclic monomer and the chemical compound into a stream of reactants to facilitate the reacting at 806, wherein the chemical reactants can comprise the intermediate polymer and/or the organocatalyst.

Figure 9:
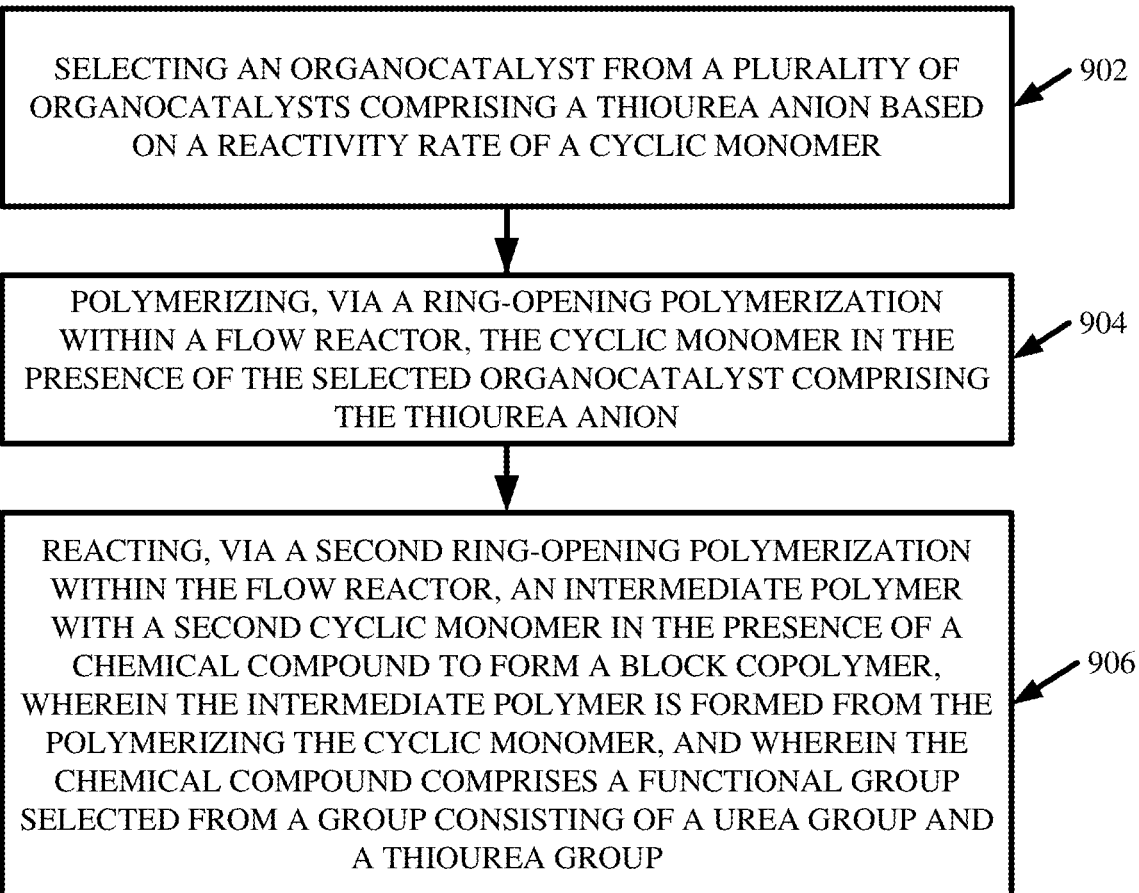
FIG. 9 illustrates a flow diagram of an example, non-limiting method that can facilitate forming a block copolymer via a plurality of ring-opening polymerization within one or more flow reactors, wherein the plurality of ring-opening polymerizations can be facilitated by a changing an active catalyst from a first thiourea anion catalyst to a second thiourea anion catalyst in accordance with one or more embodiments described herein.

FIG. 9 illustrates a flow diagram of an example, non-limiting method 900 that can facilitate forming one or more polymers (e.g., homopolymers and/or block copolymers) via one or more ROPs within one or more flow reactors 100 using one or more thiourea anion catalysts 108 in accordance with the one or more embodiments described herein. Repetitive description of like elements employed in other embodiments described herein is omitted for sake of brevity.

At 902 the method 900 can comprise selecting one or more organocatalysts from a plurality of organocatalysts comprising a thiourea anion based on a reactivity rate of one or more cyclic monomers. For example, the one or more selected organocatalyst can be thiourea anion catalysts 108. Further, the one or more cyclic monomers can be lactone monomers 102, cyclic carbonate monomers 104, and/or the cyclic monomers depicted in FIG. 2C. For instance, the plurality of organocatalysts (e.g., plurality of thiourea anion catalysts 108) can be characterized be differing respective catalytic activities. In other words, a first organocatalyst (e.g., a first thiourea anion catalyst 108) from the plurality of organocatalysts (e.g., from the plurality of thiourea anion catalysts 108) can be more reactive than a second organocatalyst (e.g., a second thiourea anion catalyst 108) from the plurality of organocatalysts (e.g., from the plurality of thiourea anion catalysts 108). Thus, the selecting at 902 can comprise selecting an organocatalyst (e.g., a thiourea anion catalyst 108) with similar reactivity as the subject one or more cyclic monomers.

At 904, the method 900 can comprise polymerizing, via a ROP within one or more flow reactors 100, the one or more cyclic monomers in the presence of the selected one or more organocatalysts comprising the thiourea anion (e.g., the one or more selected thiourea anion catalysts 108). For example, the polymerizing at 704 can be performed in accordance with the second polymerization scheme 120 and/or the fourth polymerization scheme 126. Further, the one or more selected organocatalysts can be one or more of the exemplary thiourea anion catalysts 108 presented in FIG. 4.

In one or more embodiments (e.g., regarding the polymerization of one or more block copolymers), the method 900 can further comprise, at 906, reacting, via a second ROP within the flow reactor 100, an intermediate polymer with a second cyclic monomer (e.g., a lactone monomer 102 and/or a cyclic carbonate monomer 104) in the presence of a chemical compound (e.g., a urea chemical compound 202 and/or a thiourea chemical compound 206) to form a block copolymer, wherein the intermediate polymer is formed from the polymerizing at 904, and wherein the chemical compound can comprise a functional group selected from a group consisting of a urea group and/or a thiourea group. The reacting at 906 can comprise protonating the thiourea anion via a proton transfer with the functional group to form an anionic organocatalyst (e.g., another thiourea anion catalyst 108), wherein the anionic organocatalyst can be a catalyst to the second ROP. Additionally, the method 900 can comprise injecting the second cyclic monomer and the chemical compound into a stream of reactants to facilitate the reacting at 906, wherein the chemical reactants can comprise the intermediate polymer and/or the organocatalyst.

Figure 10:
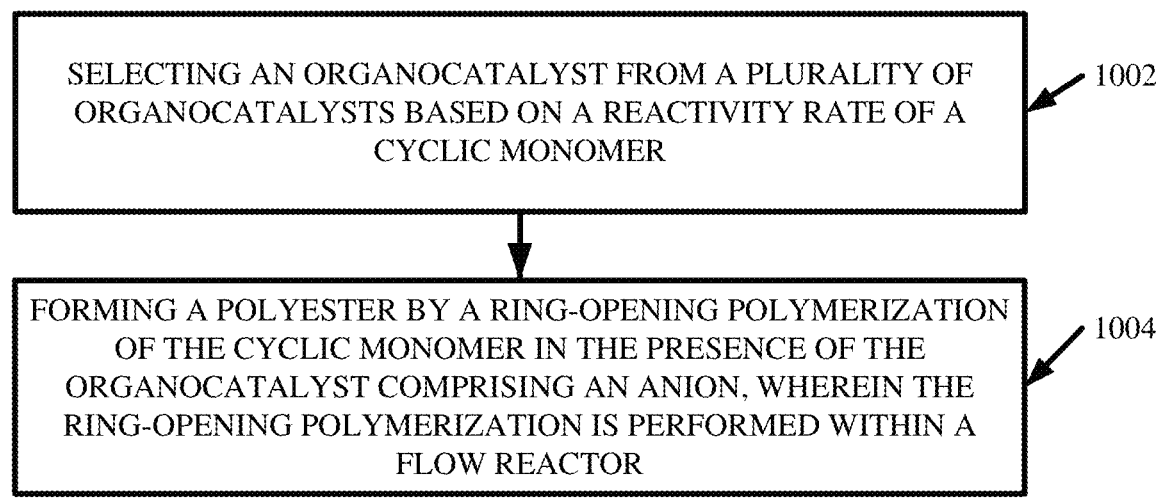
FIG. 10 illustrates a flow diagram of an example, non-limiting method that can facilitate forming one or more polyesters via a plurality of ring-opening polymerization within one or more flow reactors, wherein the plurality of ring-opening polymerizations can be facilitated by an organocatalyst in accordance with one or more embodiments described herein.

FIG. 10 illustrates a flow diagram of an example, non-limiting method 1000 that can facilitate forming one or more polyesters (e.g., homopolymers and/or block copolymers) via one or more ROPs within one or more flow reactors 100 using one or more organocatalysts in accordance with the one or more embodiments described herein. Repetitive description of like elements employed in other embodiments described herein is omitted for sake of brevity.

At 1002, the method 1000 can comprise selecting one or more organocatalysts from a plurality of organocatalysts comprising based on a reactivity rate of one or more cyclic monomers. For example, the one or more selected organocatalyst can be urea anion catalysts 106 and/or thiourea anion catalysts 108. Further, the one or more cyclic monomers can be lactone monomers 102, cyclic carbonate monomers 104, and/or the cyclic monomers depicted in FIG. 2C. Thus, the selecting at 1002 can comprise selecting an organocatalyst with similar reactivity as the subject one or more cyclic monomers.

At 1004, the method 1000 can comprise forming one or more polyesters by a ROP of the one or more cyclic monomers in the presence of the selected organocatalyst comprising an anion, wherein the ROP can be performed within one or more flow reactors 100. As described in various embodiments herein, the one or more polyesters (e.g., homopolymers and/or copolymers) can be synthesized using a variety of cyclic monomers and/or organocatalysts (e.g., urea anion catalysts 106 and/or thiourea anion catalysts 108).

Figure 11:
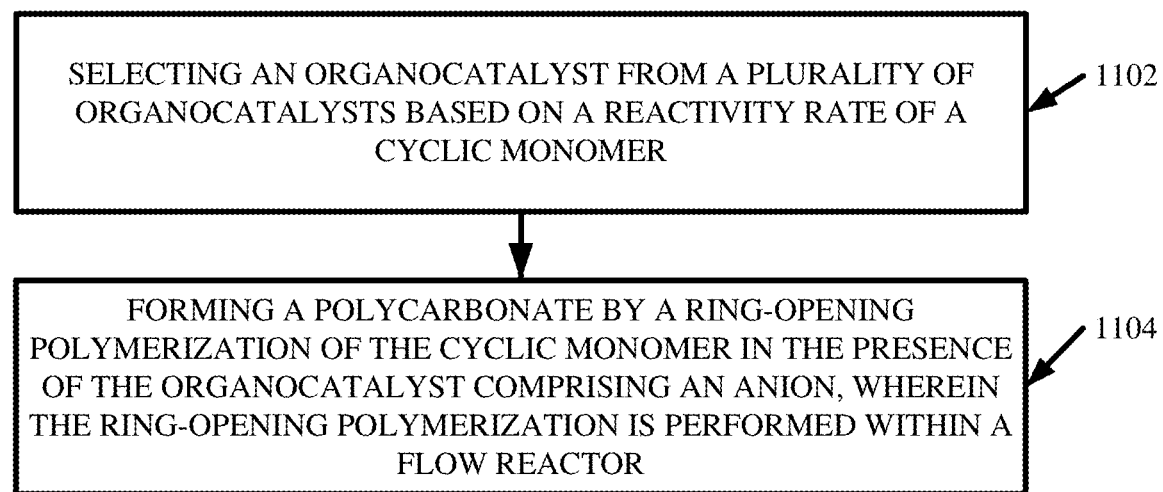
FIG. 11 illustrates a flow diagram of an example, non-limiting method that can facilitate forming one or more polycarbonates via a plurality of ring-opening polymerization within one or more flow reactors, wherein the plurality of ring-opening polymerizations can be facilitated by an organocatalyst in accordance with one or more embodiments described herein

FIG. 11 illustrates a flow diagram of an example, non-limiting method 1100 that can facilitate forming one or more polycarbonates (e.g., homopolymers and/or block copolymers) via one or more ROPs within one or more flow reactors 100 using one or more organocatalysts in accordance with the one or more embodiments described herein. Repetitive description of like elements employed in other embodiments described herein is omitted for sake of brevity.

At 1102, the method 1100 can comprise selecting one or more organocatalysts from a plurality of organocatalysts comprising based on a reactivity rate of one or more cyclic monomers. For example, the one or more selected organocatalyst can be urea anion catalysts 106 and/or thiourea anion catalysts 108. Further, the one or more cyclic monomers can be lactone monomers 102, cyclic carbonate monomers 104, and/or the cyclic monomers depicted in FIG. 2C. Thus, the selecting at 1102 can comprise selecting an organocatalyst with similar reactivity as the subject one or more cyclic monomers.

At 1104, the method 1100 can comprise forming one or more polycarbonates by a ROP of the one or more cyclic monomers in the presences of the selected organocatalyst comprising an anion, wherein the ROP can be performed within one or more flow reactors 100. As described in various embodiments herein, the one or more polycarbonates (e.g., homopolymers and/or copolymers) can be synthesized using a variety of cyclic monomers and/or organocatalysts (e.g., urea anion catalysts 106 and/or thiourea anion catalysts 108).

Figure 12A:
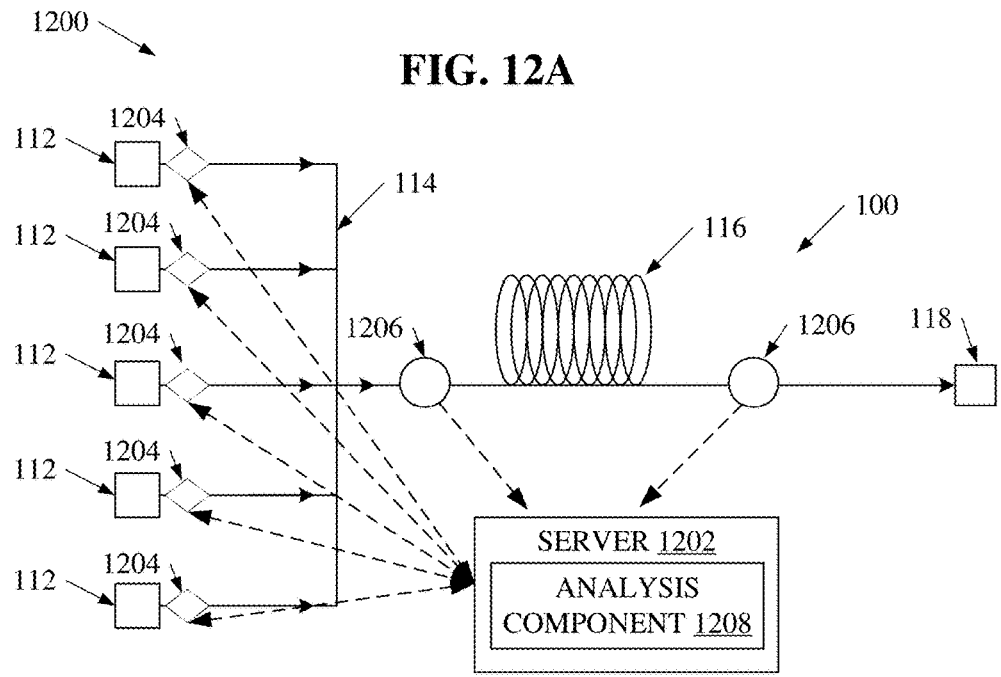
FIG. 12A illustrates a diagram of an example, non-limiting system that can facilitate autonomous control of one or more flow reactors to optimize polymerization conditions in accordance with one or more embodiments described herein.

FIG. 12A illustrates a diagram of an example, non-limiting system 1200 that can facilitate control (e.g., autonomous control) over one or more flow reactors 100 to facilitate one or more polymerizations in accordance with one or more embodiments described herein. Repetitive description of like elements employed in other embodiments described herein is omitted for sake of brevity. The system 1200 can comprise one or more flow reactors 100 operatively coupled to one or more servers 1402. The one or more servers 1402 can monitor polymerization conditions within the one or more flow reactors 100 and control one or more parameters of the one or more flow reactors 100. In one or more embodiments, the system 1200 can be utilized to facilitate one or more of the chemical reactions described herein (e.g., any of the chemical reactions described herein) in accordance with one or more embodiments.

In one or more embodiments, the one or more inlets 112 can be connected to respective compound reservoirs (not shown). The respective compound reservoirs can contain respective chemical compounds, such as, but not limited to: one or more lactone monomers 102, one or more cyclic carbonate monomers 104, one or more urea anion catalysts 106, one or more thiourea anion catalyst 108, one or more chemical bases, one or more urea chemical compounds 202, one or more thiourea chemical compounds 206, a combination thereof, and/or the like. For example, a first compound reservoir can contain one or more lactone monomers 102 and can be connected to a first inlet 112; whereas a second compound reservoir can contain one or more urea anion catalysts 106 and can be connected to a second inlet 112. In another example, a first compound reservoir can contain one or more lactone monomers 102 with a first chemical structure and can be connected to a first inlet 112; whereas a second compound reservoir can contain one or more lactone monomers 102 with a second chemical structure and can be connected to a second inlet 112 While FIG. 12A shows five respective inlets 112, which can be connected to five respective compound reservoirs, the architecture of the one or more flow reactors 100 and/or the system 1200 is not so limited. One of ordinary skill in the art will recognize that the one or more flow reactors 100 and/or the system 1200 can comprise fewer or more inlets 112 and/or respective compound reservoirs.

In one or more embodiments, the one or more flow reactors 100 can comprise one or more controller devices 1204, which can control operation of one or more respective inlets 112 to manipulate and/or otherwise adjust one or more parameters of the one or more flow reactors 100. Example devices that can comprise the one or more controller devices 1204 can include, but are not limited to: valves, pumps, actuators, a combination thereof, and/or like. Example parameters that can be controlled (e.g., adjusted) by the one or more controller devices 1204 can include, but are not limited to: the flow rate at a respective inlet 112, whether a respective inlet 112 is open (e.g., thereby enabling one or more chemical compounds contained within a respective compound reservoir to flow into the one or more channels 114) or closed (e.g., thereby inhibiting one or more chemical compounds contained within a respective compound reservoir from flowing into the one or more channels 114), how long a respective inlet 112 is open or closed, a combination thereof, and/or the like. In one or more embodiments, operation of the one or more controller devices 1204 can be controlled via the one or more servers 1202.

The one or more controller devices 1204 can be operatively connected to the one or more servers 1202 directly and/or indirectly (e.g., as indicated by dashed arrows in FIG. 12A). In one or more embodiments, the one or more controller devices 1204 can be operatively connected to the one or more servers 1202 via one or more networks (e.g., represented by dashed arrows in FIG. 12A).

Additionally, the one or more flow reactors 100 can comprise one or more sensors 1206 that can monitor and/or measure one or more polymerization conditions within the one or more flow reactors 100. Example sensors 1206 can include, but are not limited to: pressure sensors, thermometers, infrared spectrometers, nuclear magnetic resonance spectrometers, a combination thereof, and/or the like. Example polymerization conditions that can be monitored by the one or more sensors 1206 can include, but are not limited to: pressure, temperature, monomer conversion, residence time, chemical reactants, a combination thereof, and/or the like. While FIG. 12A illustrates a flow reactor 100 and/or system 1200 comprising two sensors 1206, the architecture of the one or more flow reactors 100 and/or system 1200 is not so limited. For example, the one or more flow reactors 100 and/or the system 1200 can comprise fewer or more sensors 1206 than the two depicted in FIG. 12A. Further, the one or more sensors 1206 can be positioned at various locations throughout the flow reactor 100 and/or the system 1200. In one or more embodiments, one or more of the sensors 1206 can be positioned outside the one or more flow reactors 100 and can monitor and/or measure one or more characteristics of polymers synthesized via the one or more flow reactors 100. Additionally, the one or more sensors 1206 can be positioned within and/or outside the one or channels 114 of the one or more flow reactors 100.

The one or more sensors 1206 can be operatively coupled to the one or more servers 1202 directly and/or indirectly (e.g., as indicated by dashed arrows in FIG. 12A). In one or more embodiments, the one or more controller devices 1204 can be operatively connected to the one or more servers 1202 via one or more networks (e.g., represented by dashed arrows in FIG. 12A).

The one or more networks (e.g., represented by dashed lines in FIG. 12A) that can operatively couple the one or more controller devices 1204 and/or the one or more sensors 1206 to the one or more servers 1202 can comprise wired and wireless networks, including, but not limited to, a cellular network, a wide area network (WAN) (e.g., the Internet) or a local area network (LAN). For example, the server 1202 can communicate with the one or more one or more controller devices 1204 and/or one or more sensors 1206 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like.

In various embodiments, one or more aspects of the one or more servers 1202 can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described. The one or more servers 1202 can comprise analysis component 1208. In one or more embodiments, the server 1202 can be located in and/or other communicate with a cloud computing environment. The one or more servers 1202 can receive data from the one or more sensors 1206 regarding monitored and/or measured polymer conditions and send one or more commands to the one or more controller devices 1204 to control and/or otherwise adjust one or more parameters of the one or more flow reactors 100.

In one or more embodiments the analysis component 1208 can determine optimal polymerization conditions to synthesize one or more target polymers by: controlling the one or more controller devices 1204 to conduct a plurality of variations to a subject polymerization; controlling the one or more controller devices 1204 to facilitate different flow reactor 100 parameters for each respective variation; and/or monitoring the resulting polymerization conditions associated with each variation. For example, to determine an optimal flow rate for a given ROP in the one or more flow reactor 100, the analysis component 1208 can control the one or more flow reactors 100 (e.g., via operation of the one or more controller devices 1204) to conduct multiple iterations of the ROP, each iteration with a different flow rate. The analysis component 1208 can than compare one or more polymerization conditions (e.g., molecular weight distribution) associated with each iteration (e.g., by the one or more sensors 1206) to identify the iteration associated with the most preferred polymerization condition and thereby determine the optimal flow rate.

In another example, the analysis component 1208 can control the one or more controller devices 1204 to change the identity of a catalyst used in a subject ROP within the one or more flow reactor 100. The analysis component 1208 can perform multiple iterations of the ROP, wherein in each respective iteration a different inlet 112 is opened and/or closed by the one or more controller devices 1204 to facilitate the introduction of a different catalyst (e.g., a urea anion catalyst 106 and/or a thiourea anion catalyst 108). The analysis component 1208 can than compare one or more polymerization conditions (e.g., molecular weight distribution) associated with each iteration (e.g., by the one or more sensors 1206) to identify the iteration associated with the most preferred polymerization condition and thereby determine the optimal catalyst.

Further, for iterations of a given polymerization, the analysis component 1208 can store the detected polymerization conditions and/or associate flow reactor 100 parameters in a computer memory. For instance, the analysis component 1208 can control the one or more flow reactors 100 to collect the data comprised within, for example, Tables 1-4. Additionally, the one or more servers 1202 can share data regarding polymerization conditions (e.g., as monitored and/or detected by the one or more sensors 1206) and/or associate flow reactor 100 parameters (e.g., operational conditions of one or more inlets 112) with one or more other servers 1202 (e.g., to facilitate optimization of one or more polymerization conditions in one or more other flow reactors 100).

In one or more embodiments, the one or more servers 1202 act as an Internet of Thinks ("IoT") interface between the system 1200 and one or more artificial intelligence technologies ("AI") and/or user driven program platforms to facilitate cognitively designed flow reactor 100 parameters that can optimize target polymerization conditions for a given polymerization. For example, the one or more AI technologies can utilize one or more optimization methods (e.g., differential evolution and/or effective differential evolution algorithms) to analyze data collected by one or more servers 1202 regarding one or more polymerization variations.

Figure 12B:
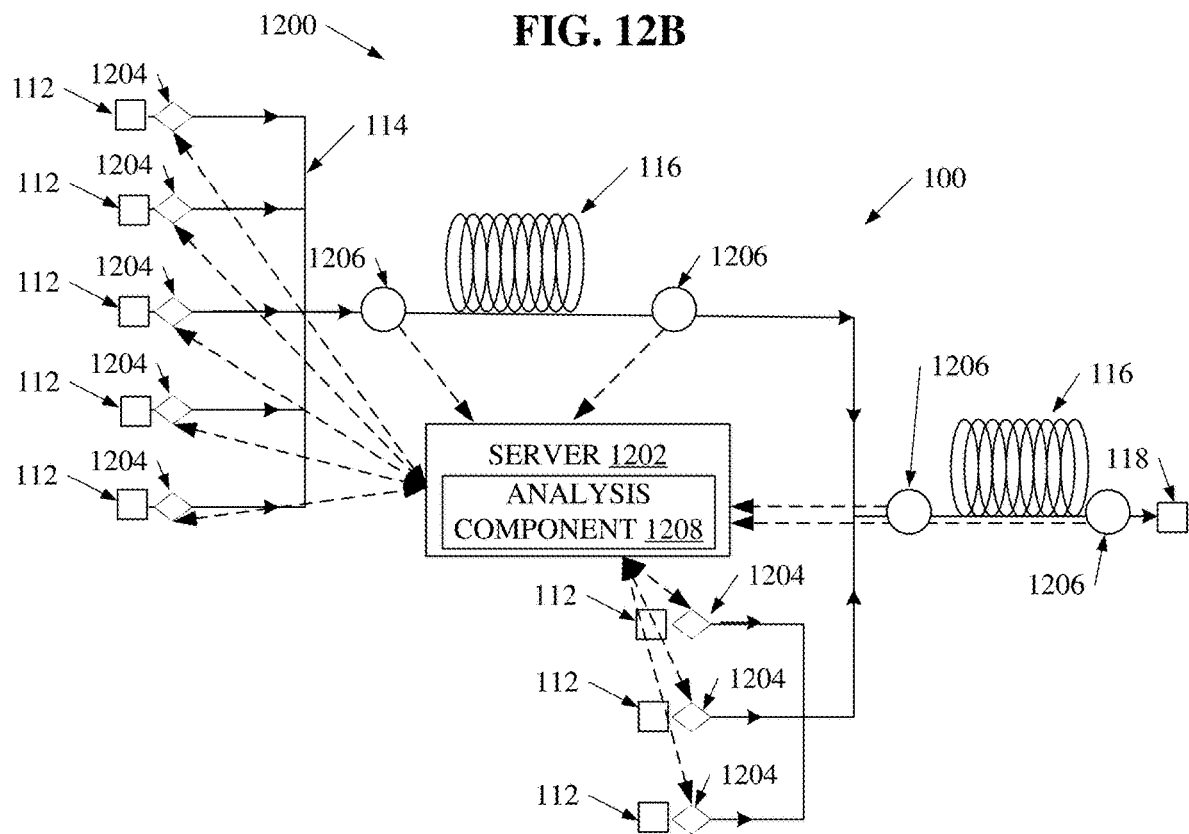
FIG. 12B illustrates a diagram of an example, non-limiting system that can facilitate autonomous control of one or more flow reactors to optimize polymerization conditions of one or more ring-opening polymerizations within the one or more flow reactors in accordance with one or more embodiments described herein.

FIG. 12B illustrates a diagram of the example, non-limiting system 1200 that can facilitate control (e.g., autonomous control) over one or more flow reactors 100 to facilitate one or more polymerizations in accordance with one or more embodiments described herein. Repetitive description of like elements employed in other embodiments described herein is omitted for sake of brevity. FIG. 12B exemplifies that the system 1200 is not limited to use of a single flow reactor 100, a single set of reactor loops 116, and/or a single polymerization (e.g., ROP). For example, as shown in FIG. 12B the system 1200 can be utilized to control and/or analyze one or more flow reactors 100 for syntheses involving multiple ROPs, such as the one or more polymerization schemes depicted and/or described with regards to FIGS. 1-11B.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
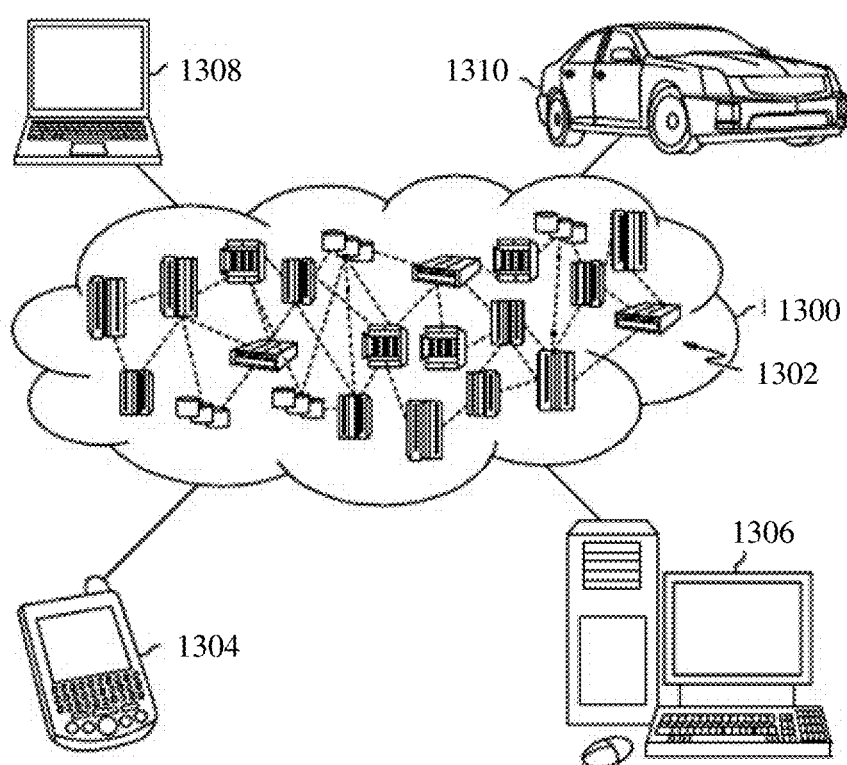
FIG. 13 depicts a cloud computing environment in accordance with one or more embodiments described herein.

Referring now to FIG. 13, illustrative cloud computing environment 1300 is depicted. Repetitive description of like elements employed in other embodiments described herein is omitted for sake of brevity. As shown, cloud computing environment 1300 includes one or more cloud computing nodes 1302 with which local computing devices used by cloud consumers, such as, for example, personal digital assistant (PDA) or cellular telephone 1304, desktop computer 1306, laptop computer 1308, and/or automobile computer system 1310 may communicate. Nodes 1302 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 1304-1310 shown in FIG. 13 are intended to be illustrative only and that computing nodes 1302 and cloud computing environment 1300 can communicate with any type of computerized device over any type of network and/or network addressable connection (e.g., using a web browser).

Figure 14:
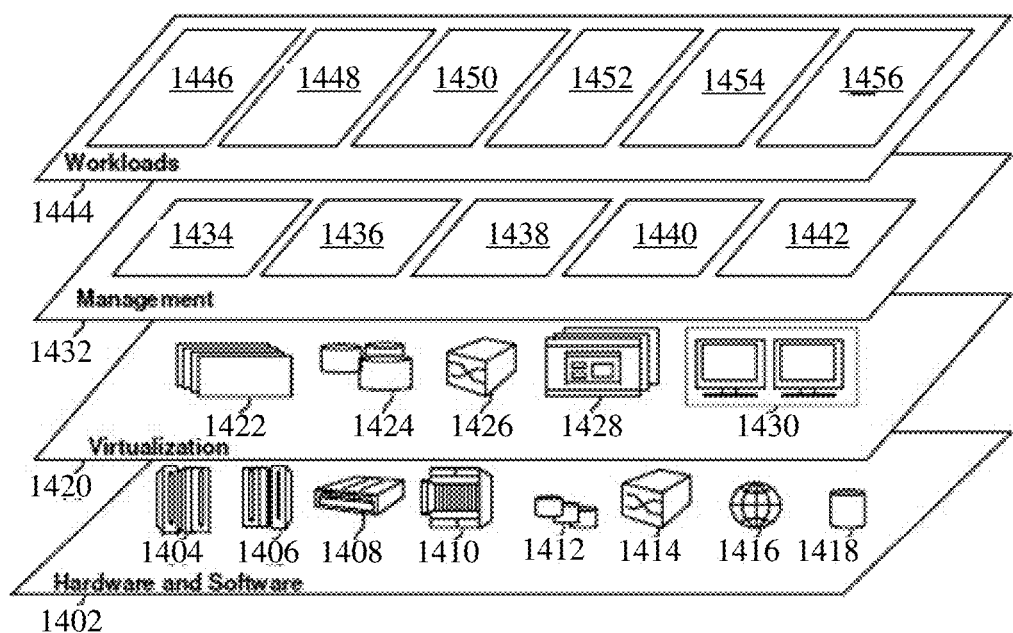
FIG. 14 depicts abstraction model layers in accordance with one or more embodiments described herein.

Referring now to FIG. 14, a set of functional abstraction layers provided by cloud computing environment 1300 (FIG. 13) is shown. Repetitive description of like elements employed in other embodiments described herein is omitted for sake of brevity. It should be understood in advance that the components, layers, and functions shown in FIG. 14 are intended to be illustrative only and embodiments of the invention are not limited thereto. As depicted, the following layers and corresponding functions are provided.

Hardware and software layer 1402 includes hardware and software components. Examples of hardware components include: mainframes 1404; RISC (Reduced Instruction Set Computer) architecture based servers 1406; servers 1408; blade servers 1410; storage devices 141412; and networks and networking components 1414. In some embodiments, software components include network application server software 1416 and database software 1418.

Virtualization layer 1420 provides an abstraction layer from which the following examples of virtual entities may be provided: virtual servers 1422; virtual storage 1424; virtual networks 1426, including virtual private networks; virtual applications and operating systems 1428; and virtual clients 1430.

In one example, management layer 1432 may provide the functions described below. Resource provisioning 1434 provides dynamic procurement of computing resources and other resources that are utilized to perform tasks within the cloud computing environment. Metering and Pricing 1436 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1438 provides access to the cloud computing environment for consumers and system administrators. Service level management 1440 provides cloud computing resource allocation and management such that required service levels are met. Service Level Agreement (SLA) planning and fulfillment 1442 provide pre-arrangement for, and procurement of, cloud computing resources for which a future requirement is anticipated in accordance with an SLA.

Workloads layer 1444 provides examples of functionality for which the cloud computing environment may be utilized. Examples of workloads and functions which may be provided from this layer include: mapping and navigation 1446; software development and lifecycle management 1448; virtual classroom education delivery 1450; data analytics processing 1452; transaction processing 1454; and/or polymerization design 1456. Various embodiments of the present invention can utilize the cloud computing environment described with reference to FIGS. 13 and 14 to facilitate optimizing one or more polymerization conditions via manipulation and/or control of one or more parameters of one or more flow reactors 100.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 15:
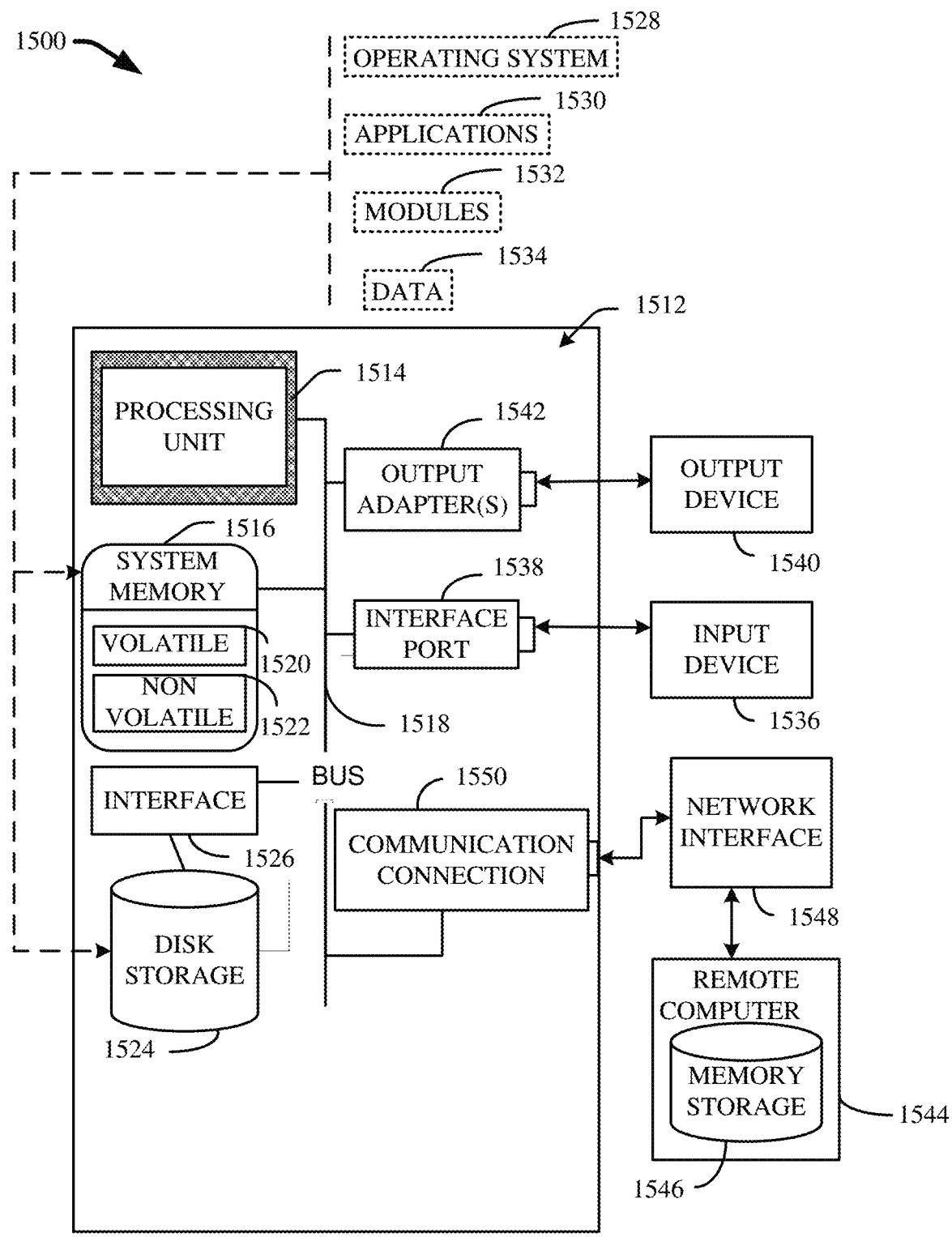
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter, such as the one or more servers 1202, can be implemented. FIG. 15 illustrates a block diagram of an example, non-limiting operating environment in which one or more embodiments described herein can be facilitated. Repetitive description of like elements employed in other embodiments described herein is omitted for sake of brevity. With reference to FIG. 15, a suitable operating environment 1500 for implementing various aspects of this disclosure can include a computer 1512. The computer 1512 can also include a processing unit 1514, a system memory 1516, and a system bus 1518. The system bus 1518 can operably couple system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1516 can also include volatile memory 1520 and nonvolatile memory 1522. The basic input/output system (BIOS), containing the basic routines to transfer information between elements within the computer 1512, such as during start-up, can be stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface can be used, such as interface 1526. FIG. 15 also depicts software that can act as an intermediary between users and the basic computer resources described in the suitable operating environment 1500. Such software can also include, for example, an operating system 1528. Operating system 1528, which can be stored on disk storage 1524, acts to control and allocate resources of the computer 1512. System applications 1530 can take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through one or more input devices 1536. Input devices 1536 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1514 through the system bus 1518 via one or more interface ports 1538. The one or more Interface ports 1538 can include, for example, a serial port, a parallel port, a game port, and a universal serial bus (USB). One or more output devices 1540 can use some of the same type of ports as input device 1536. Thus, for example, a USB port can be used to provide input to computer 1512, and to output information from computer 1512 to an output device 1540. Output adapter 1542 can be provided to illustrate that there are some output devices 1540 like monitors, speakers, and printers, among other output devices 1540, which require special adapters. The output adapters 1542 can include, by way of illustration and not limitation, video and sound cards that provide a means of connection between the output device 1540 and the system bus 1518. It should be noted that other devices and/or systems of devices provide both input and output capabilities such as one or more remote computers 1544.

Computer 1512 can operate in a networked environment using logical connections to one or more remote computers, such as remote computer 1544. The remote computer 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer 1544. Remote computer 1544 can be logically connected to computer 1512 through a network interface 1548 and then physically connected via communication connection 1550. Further, operation can be distributed across multiple (local and remote) systems. Network interface 1548 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   polymerizing, via a ring-opening polymerization within a flow reactor, a cyclic monomer in the presence of an organocatalyst comprising a thiourea anion to synthesize a homopolymer, wherein the ring-opening polymerization has a residence time within the flow reactor of greater than or equal to 0.006 seconds and less than or equal to 3.5 seconds.

2. The method of claim 1, wherein the cyclic monomer is selected from a group consisting of a lactone monomer, a cyclic carbonate monomer, a substituted cyclic carbonate monomer, a cyclic phospholane monomer, a morpholinone monomer, tetrahydro-2H-pyran-2-thione, oxepane-2-thione, tetrahydrothiopyranone, and 2-thiepanone.

3. The method of claim 2, wherein the organocatalyst is derived from a chemical compound selected from a second group consisting of N,N'-di[3,5-di(trifluoromethyl)phenyl] thiourea, 1-[3,5-bis(trifluoromethyl)phenyl]-3-[3-(trifluoromethyl)phenyl] thiourea, 1-[3,5-bis(trifluoromethyl)phenyl]-3-phenylthiourea, 1-[3,5-bis(trifluoromethyl)phenyl]-3-cyclohexylthiourea, 1-phenyl-3-[3-(trifluoromethyl)phenyl] thiourea, N,N'-diphenylthiourea, and 1-cyclohexyl-3-phenylthiourea.

4. The method of claim 3, wherein the thiourea anion is derived from a chemical reaction between the chemical compound and a chemical base, wherein the chemical base is selected from a third group consisting of 1,8-diazabicyclo[5.4.0]undec-7-ene, 7-methyl-1,5,7-triazabicyclo[4.4.0]dec-5-ene, phosphazene bases, 1,3,2-diazaphosphorin-2-amin, 2-[(1,1-dimethylethyl)imino]-N,N-diethyl-1,2,2,2,3,4,5,6-octahydro-1,3-dimethyl, 1,3-dihydro-1,3-bis(2,4,6-trimethylphenyl)imidazole-2-ylidene, potassium methoxide, potassium hydride, sodium methoxide, and sodium hydride.

5. The method of claim 1, further comprising:
   selecting the organocatalyst from a plurality of organocatalysts comprising the thiourea anion based on a reactivity rate of the cyclic monomer.

6. The method of claim 1, further comprising:
   reacting, via a second ring-opening polymerization within the flow reactor, an intermediate polymer with a second cyclic monomer in the presence of a chemical compound to form a block copolymer, wherein the intermediate polymer is formed from the polymerizing the cyclic monomer, and wherein the chemical compound comprises a functional group selected from a thiourea group.

7. The method of claim 6, wherein the reacting comprises protonating the thiourea anion via a proton transfer with the functional group to form an anionic organocatalyst, and wherein the anionic organocatalyst is a catalyst to the second ring-opening polymerization.

8. The method of claim 7, further comprising injecting the second cyclic monomer and the chemical compound into a stream of chemical reactants to facilitate the reacting, wherein the chemical reactants comprise the intermediate polymer, the chemical base, and the organocatalyst.

9. A system comprising:
   a flow reactor that houses a stream of chemical reactants to facilitate a polymerization;
   a memory that stores computer executable components; and
   a processor, operably coupled to the memory, and that executes the computer executable components stored in the memory, wherein the computer executable components comprise:
      an analysis component, operatively coupled to the processor, that controls a parameter of the flow reactor based on a characteristic of a homopolymer produced by the polymerization, wherein the chemical reactants comprise a cyclic monomer and an organocatalyst comprising a thiourea anion, wherein the polymerization is a ring-opening polymerization having a residence time within the flow reactor of greater than or equal to 0.006 seconds and less than or equal to 3.5 seconds.

10. The system of claim 9, wherein the cyclic monomer is selected from a group consisting of a lactone monomer, a cyclic carbonate monomer, a substituted cyclic carbonate monomer, a cyclic phospholane monomer, a morpholinone monomer, tetrahydro-2H-pyran-2-thione, oxepane-2-thione, tetrahydrothiopyranone, and 2-thiepanone.

11. The system of claim 9, wherein the flow reactor comprises a sensor that detects the characteristic, wherein the parameter affects a polymerization condition of the polymerization.

12. The system of claim 11, wherein the polymerization condition is selected from a group consisting of a flow rate of the stream, a turbulence of the stream within the flow reactor, and an amount of chemical reactants comprised within the stream.

13. The system of claim 9, wherein the analysis component controls the parameter via cloud computing environment.

14. A method, comprising:
   forming a polyester homopolymer by a ring-opening polymerization of a cyclic monomer in the presence of an organocatalyst comprising a thiourea anion, wherein the ring-opening polymerization is performed at a residence time within a flow reactor of greater than or equal to 0.006 seconds and less than or equal to 3.5 seconds.

15. The method of claim 14, wherein the cyclic monomer is a lactone monomer.

16. A method, comprising:
   forming a polycarbonate homopolymer by a ring-opening polymerization of a cyclic monomer in the presence of an organocatalyst comprising thiourea anion, wherein the ring-opening polymerization is performed at a residence time within a flow reactor of greater than or equal to 0.006 seconds and less than or equal to 3.5 seconds.

17. The method of claim 16, wherein the cyclic monomer is a cyclic carbonate monomer.

* * * * *